Figure 1:
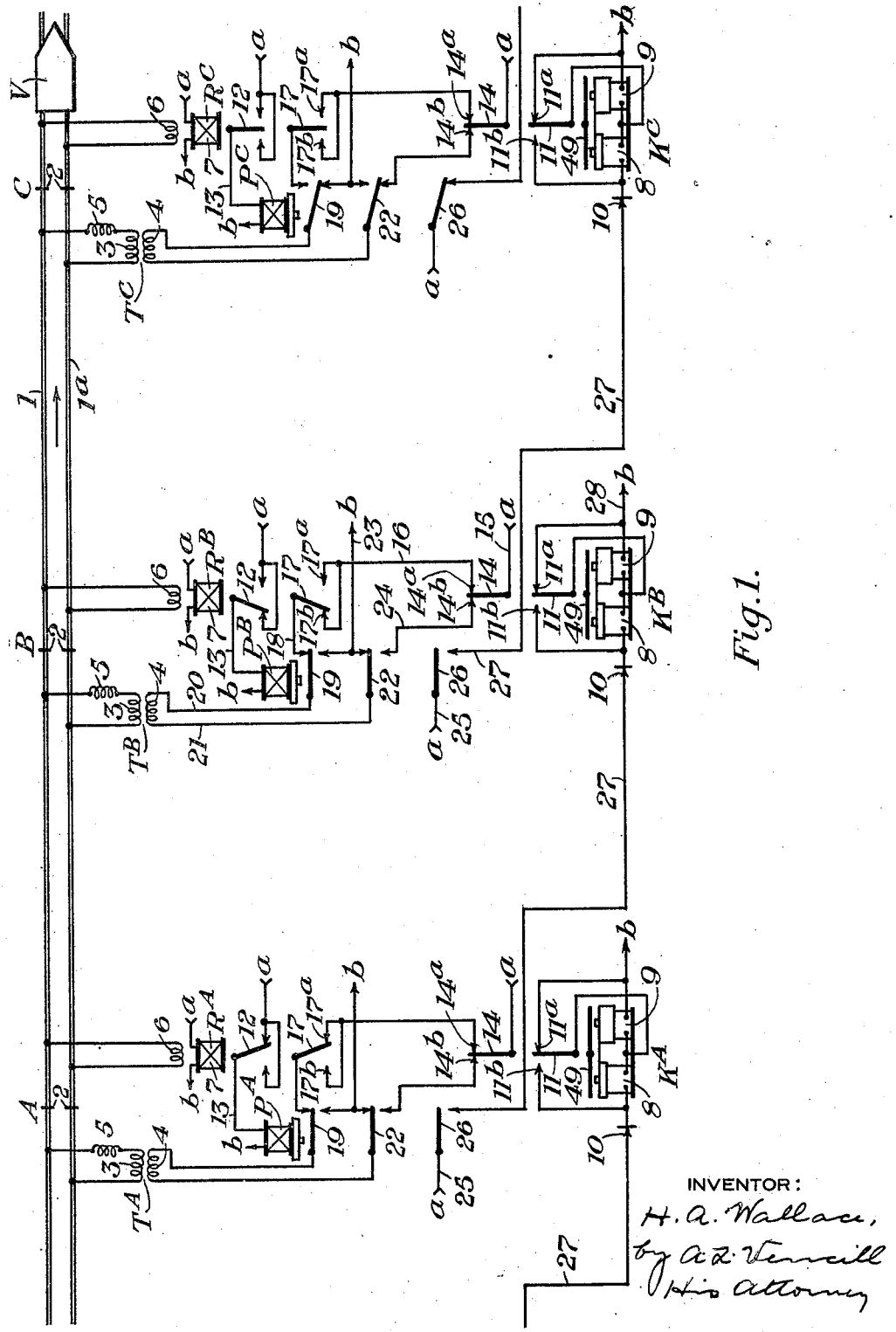

June 16, 1931.  H. A. WALLACE  1,810,094
RAILWAY TRAFFIC CONTROLLING APPARATUS
Original Filed May 5, 1926   10 Sheets-Sheet 1

INVENTOR:
H. A. Wallace,
by A. L. Vennill
His Attorney

June 16, 1931.  H. A. WALLACE  1,810,094
RAILWAY TRAFFIC CONTROLLING APPARATUS
Original Filed May 5, 1926   10 Sheets-Sheet 5

INVENTOR:
H. A. Wallace,
by A. R. Vencill
His Attorney

June 16, 1931. H. A. WALLACE 1,810,094
RAILWAY TRAFFIC CONTROLLING APPARATUS
Original Filed May 5, 1926 10 Sheets-Sheet 6

INVENTOR:
H. A. Wallace
by A. R. Vencill
His Attorney

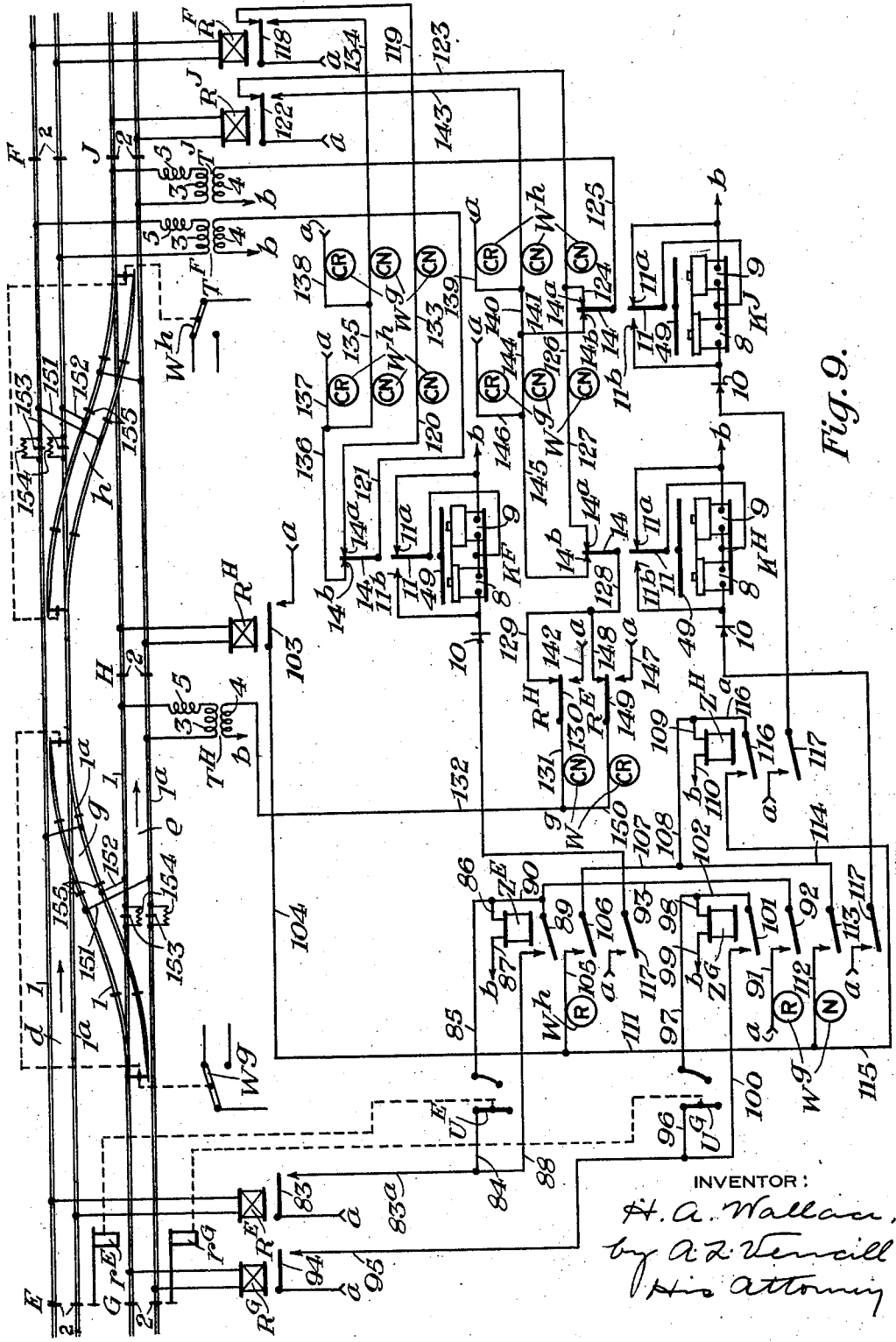

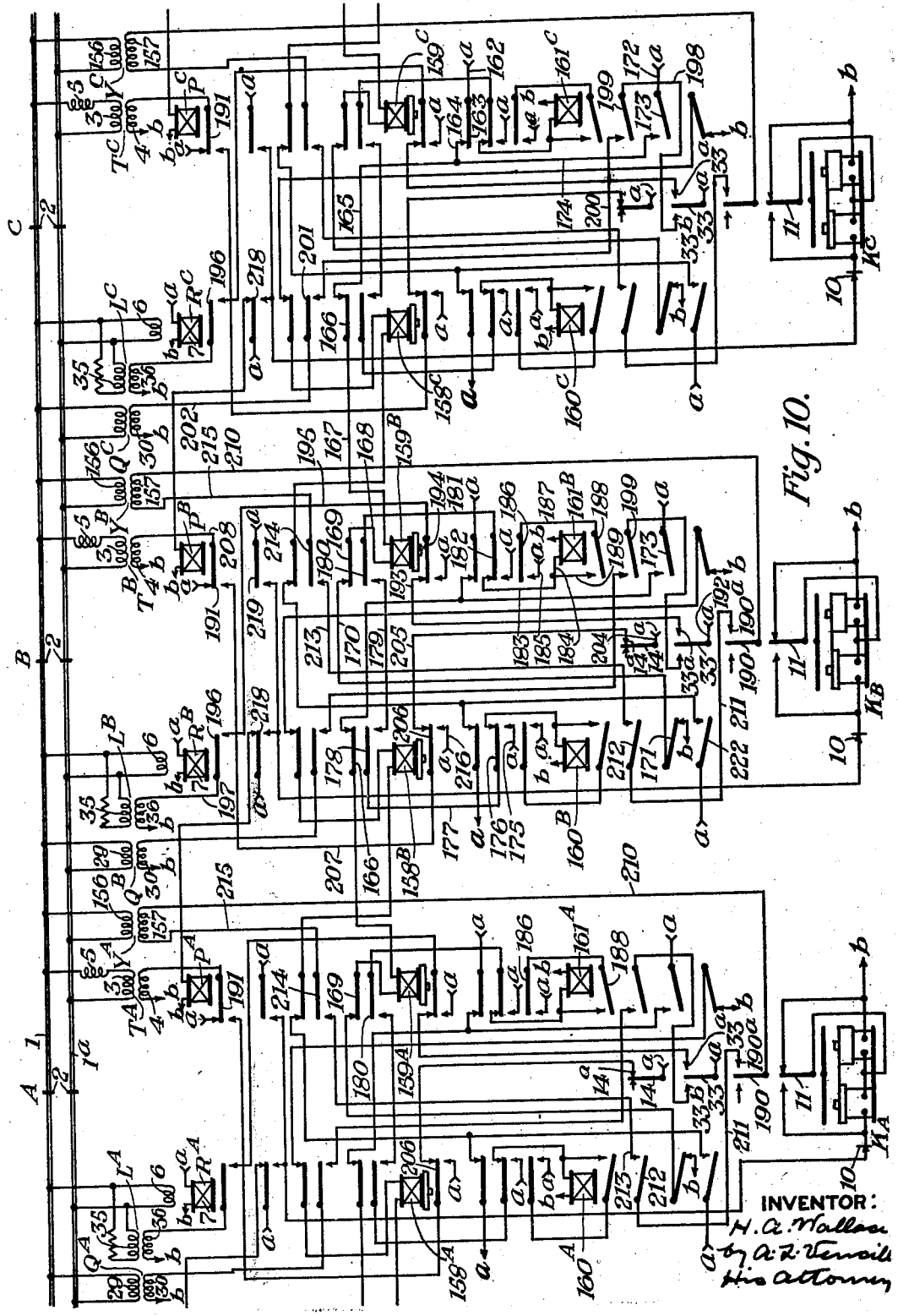

Patented June 16, 1931

1,810,094

UNITED STATES PATENT OFFICE

HERBERT A. WALLACE, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY TRAFFIC CONTROLLING APPARATUS

Application filed May 5, 1926, Serial No. 106,871. Renewed August 3, 1929.

My invention relates to railway traffic controlling apparatus, and particularly to apparatus comprising governing means controlled by energy in the track rails. More particularly my present invention relates to the trackway portion of such apparatus.

One purpose of my invention is the provision of novel means for supplying energy to the track rails so that uninterrupted alternating current is normally supplied to the rails but that under certain conditions the supply of such current is periodically interrupted, the characteristic of these periodic interruptions being controlled in accordance with traffic conditions.

I will describe several forms of trackway apparatus embodying my invention, and will then point out the novel features thereof in claims.

In the accompanying drawings, Figs. 1 to 8, inclusive, are diagrammatic views illustrating several forms of trackway apparatus embodying my invention as applied to a stretch of track over which traffic normally moves in one direction only. Fig. 9 is a view showing my invention applied to two parallel tracks connected by cross-overs. Fig. 10 is a view illustrating the application of my invention to a stretch of track over which traffic moves in both directions.

Similar reference characters refer to similar parts in each of the several views.

Figure 6:
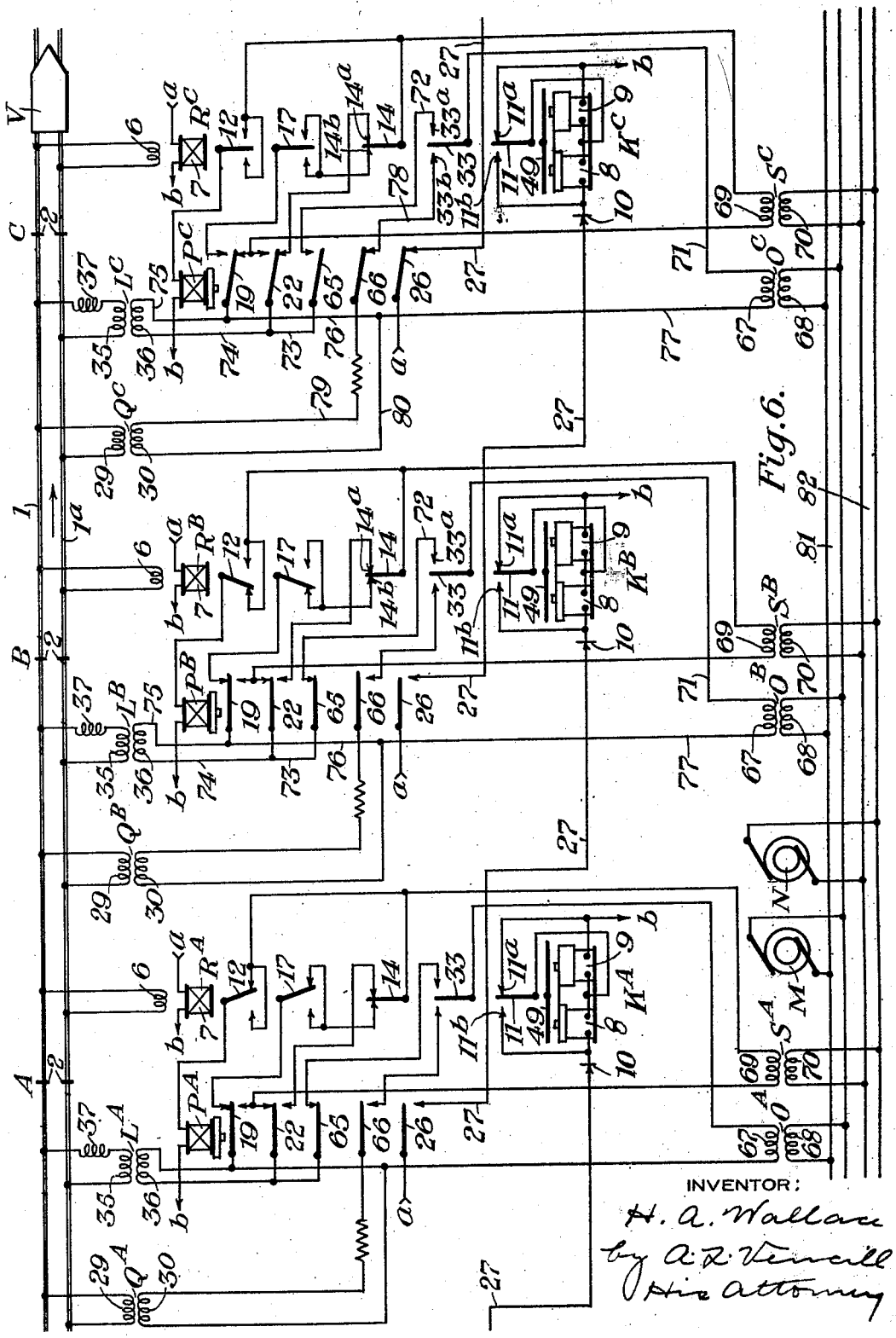

The specific modifications shown in Figs. 6, 9 and 10 have been made the subject-matter of separate divisional applications designated by Serial Numbers 383,731, 383,732, and 383,733, respectively, and all filed on August 5, 1929.

Referring first to Fig. 1, the reference characters 1 and 1ª designate the track rails of a stretch of railway track over which traffic normally moves in the direction indicated by the arrow. These track rails are divided, by means of insulated joints 2, into a plurality of successive track sections, A—B, B—C, etc. Each track section is provided with a track relay designated by the reference character R with an exponent corresponding to the location and comprising two windings 6 and 7. Winding 6 of each track relay is constantly connected across the rails adjacent the entrance end of the associated section and winding 7 is constantly supplied with alternating current from terminals $a$ and $b$ of a suitable source of alternating current not shown in the drawing. Each relay R also comprises two contacts 12 and 17 arranged to occupy a right-hand, a left-hand or an intermediate position, depending upon the relative polarity of the alternating current supplied to the windings 6 and 7 of the relay.

Each track section is supplied with alternating current from a track transformer designated by the reference character T with an exponent corresponding to the location and comprising a secondary 3 constantly connected across the rails adjacent the exit end of the associated section in series with the usual impedance 5. The supply of alternating current to the primary 4 of each track transformer T is controlled by a repeater relay designated by the reference character P with an exponent corresponding to the location and controlled by the adjacent track relay R. Referring, for example, to repeater relay $P^B$, it will be seen that when relay $R^B$ is energized in either direction so that contact 12 is swung to either extreme position, current flows from one terminal $a$ of a suitable source of current, through contact 12 of relay $R^B$ and wire 13 to the winding of relay $P^B$ and thence back to the other terminal $b$ of the same source. When relay $R^B$ is de-energized, however, this circuit for relay $P^B$ is open and the relay becomes de-energized.

Each track section is further provided with a coding relay designated by the reference character K with an appropriate distinguishing exponent and controlled by the repeater relay for the section next in rear. Each relay K comprises two magnets 8 and 9 and a pivoted armature 49 biased to a central position but arranged to be attracted by one or the other of the magnets. Carried by the armature 49 are movable contacts 11 and 14 which swing to one side or the other depending upon which of the magnets 8 or 9 is attracting the armature. The relays K are intended to operate on direct current, and since the source of energy, the terminals $a$ and $b$ of which are shown in the drawing, is a source of alternating current, a rectifier 10 is included in the circuit for each relay K to change the alternating current supplied thereto to a direct current.

Referring particularly to coding relay $K^B$, the circuit for this relay may be traced from terminal $a$, through wire 25, back contact 26 of repeater relay $P^A$, wire 27, rectifier 10, magnets 8 and 9 of relay $K^B$, and wire 28 to terminal $b$. It will be seen that contact 11—$11^a$ is arranged to short circuit magnet 9 and contact 11—$11^b$ is arranged to short circuit magnet 8. The contacts are so arranged that when the coding relay is de-energized contact 11—$11^a$ is closed. If therefore, the operating circuit just traced for the relay $K^B$ is closed, current supplied to the relay flows through magnet 8, but is shunted around magnet 9 by contact 11—$11^a$. Armature 49 is therefore attracted by magnet 8 to open contact 11—$11^a$ and close contact 11—$11^b$. Current is then supplied to magnet 9 and magnet 8 is short circuited. The magnets 8 and 9 are arranged to be slow acting however, so that an interval of time elapses before the increasing flux in magnet 9 overcomes the decreasing flux in magnet 8 to a sufficient degree to again reverse armature 49. At the expiration of this time interval armature 49 swings back toward magnet 9 and contact 11—$11^b$ is opened and contact 11—$11^a$ is closed. Another time interval elapses before armature 49 is again reversed. It follows that as long as the circuit is closed for relay K, the armature 49 oscillates so that the contacts controlled by the armature are operated intermittently. The contacts 14—$14^a$ and 14—$14^b$ are so adjusted that these contacts are both closed when the relay is de-energized. When the relay is energized however, these contacts are opened alternately. The parts are so arranged as indicated by the unequal shunting bands on the magnets 8 and 9, that when the relay K is operated contact 14—$14^a$ is closed for a larger proportion of each cycle than is contact 14—$14^b$. For example, assuming that a complete cycle of operation of the relay requires one second, the contacts may be so arranged that contact 14—$14^a$ is closed for two-thirds of a second and contact 14—$14^b$ is closed for one-third of a second. This adjustment to accomplish unequal timing of the relay contacts or "limping" of the relay may be effected by suitable adjustments in the structure of the relay or in the positions of the contact members.

The supply of current to the primary 4 of each track transformer T is controlled by the adjacent repeater relay P as stated hereinbefore, and also by the adjacent coding relay K. Transformer $T^B$, for example, is provided with one circuit which may be traced from terminal $a$, through wire 15, contact 14—$14^a$ of coding relay $K^B$ wire 16, contact 17—$17^a$ or 17—$17^b$ of relay $R^B$, wire 18, front contact 19 of relay $P^B$, wire 20, primary 4 of transformer $T^B$, wire 21, front contact 22 of relay $P^B$, and wire 23 to terminal $b$. This circuit is closed only when track relay $R^B$ is energized in one direction or the other, and when relay $P^B$ is energized and when coding relay $K^B$ is de-energized or is energized in such direction as to swing contact 14 to the right. It follows that if the circuit just traced for transformer $T^B$ is closed and relay $K^B$ is operating as when a train occupies section A—B, the oscillation of contact 14 will periodically interrupt such circuit. Contact 14—$14^a$ is closed for two-thirds of a second and open for one-third of a second during each cycle of operation of relay $K^B$ so that current will be supplied to the track rails under these conditions in the form of code impulse combinations, comprising impulses of alternating current of two-thirds of a second duration separated by time intervals of one-third of a second during which no current flows in the trackway. Code impulse combinations supplied to the trackway in this manner I shall hereinafter term the "proceed code".

If relay $P^B$ is de-energized, as by the presence of a train in section B—C, current flows from terminal $a$, through wire 15, contact 14—$14^b$ of coding relay $K^B$, wire 24, back contact 22 of relay $P^B$, wire 21, primary 4 of transformer $T^B$, wire 20, back contact 19 of relay $P^B$ and wire 23 to terminal $b$. When this circuit is closed and relay $K^B$ becomes energized the intermittent operation of contact 14—$14^b$ periodically interrupts the current supplied to the rails of section A—B so that the rails are then supplied with current in the form of code impulse combinations, comprising impulses of alternating current of one-third of a second duration separated by time intervals of two-thirds of a second during which time no current flows in the trackway. Code impulse combinations supplied in this manner I shall hereinafter call the "caution code".

It should be pointed out that when relay $P^B$ is energized current of one relative polarity which I will call "normal relative polarity" is supplied to the rails of section A—B but that when relay $P^B$ becomes de-energized current of the opposite relative polarity which I will call "reverse relative polarity" is supplied to rails of the section A—B. The track relay $R^B$ is responsive, as explained hereinbefore, to reversals of the relative polarity of the current supplied to the track rails so that when current of normal relative polarity is supplied to section A—B contacts 12 and 17 are swung to the right into their normal positions but that when the section A—B is supplied with current of reverse relative polarity, these contacts are swung to the left into their reverse positions.

The track relays may be used to control trackway signals or other governing means, not shown in the drawing, in any suitable manner.

As shown in the drawing, the section to the right of point C is occupied by a train indicated diagrammatically at V. Relay $R^C$ is therefore de-energized so that relay $P^C$ is also de-energized. Current of reverse relative polarity is therefore supplied to the rails of section B—C by transformer $T^C$ so that relay $R^B$ is energized in the reverse direction. Relay $P^B$ is therefore energized and the back contact 26 of this relay being open, relay $K^C$ is de-energized. The current supplied to primary 4 of transformer $T^C$ is therefore uninterrupted. In similar fashion the current of normal relative polarity which is supplied to the rails of section A—B picks up relay $R^A$ in the normal direction so that relay $P^A$ is energized thereby holding open the circuit for relay $K^B$ so that the current supplied to the rails of section A—B is uninterrupted. In similar manner, uninterrupted current or normal relative polarity is supplied to the rails of the section to the left of point A.

It should be pointed out that the trackway apparatus here shown and described is suitable for, though in no way limited to, use in connection with train carried governing means forming no part of my present invention and omitted from the drawing for the sake of simplicity. For present purposes it is sufficient to state that when the portion of track occupied by the train is supplied with code impulse combinations in accordance with the proceed code, a proceed indication is received on board the train; when the portion of track which is occupied by the train is supplied with code impulse combinations in accordance with the caution code, a caution indication is received on board the train; and when the rails occupied by the train are supplied with uninterrupted alternating current or with no current, the train receives a stop indication. In train control systems of the type described, the receiving apparatus through the medium of which the train carried governing means is controlled in accordance with the trackway current is usually located at the forward end of the train in advance of the front axle. With this arrangement it is apparent that train controlling current must be supplied to the train from a point in advance of the train.

With this explanation in mind, I will assume that a train moving in the direction indicated by the arrow passes through the stretch of track shown in the drawing. As this train enters section A—B, relay $R^A$ becomes de-energized, thereby de-energizing relay $P^B$ and completing the circuit for coding relay $K^B$ so that the latter relay commences to operate. The current supplied to section A—B is therefore broken up into code impulse combinations in accordance with the proceed code so that a proceed indication is received on board the train throughout section A—B.

When the train enters section B—C, the resulting de-energization of relays $R^B$ and $P^B$ completes the circuit for coding relay $K^C$ which therefore commences to operate and the intermittent operation of contact 14—14$^b$ of relay $K^C$ breaks up the current supplied to section B—C into code impulse combinations in accordance with the caution code. The train therefore receives a caution indication throughout section B—C. Should the train enter the section to the right of point C it would be deprived of current by the shunting effect of the wheels and axles of the train V already occupying the section, and a stop indication would be received on board the train.

When a train moves out of a section, the track relay for the section next in rear swings from its reverse to its normal position. Referring to the drawing, relay $R^B$ is energized in the reverse direction because relay $P^C$ is de-energized due to the presence of the train V in the section to the right of point C. When this train leaves the section it now occupies, relay $R^C$ will become energized, picking up relay $P^C$ and energizing relay $R^B$ in the normal direction. During this operation of relay $R^B$, the circuit for relay $P^B$ will be open for a brief interval, but due to the slow releasing characteristics of relay $P^B$, this relay will hold its front contact closed, thereby preventing a momentary reversal in the polarity of the current supplied to section A—B. For similar reasons each of the other relays P is made slow releasing.

Figure 2:
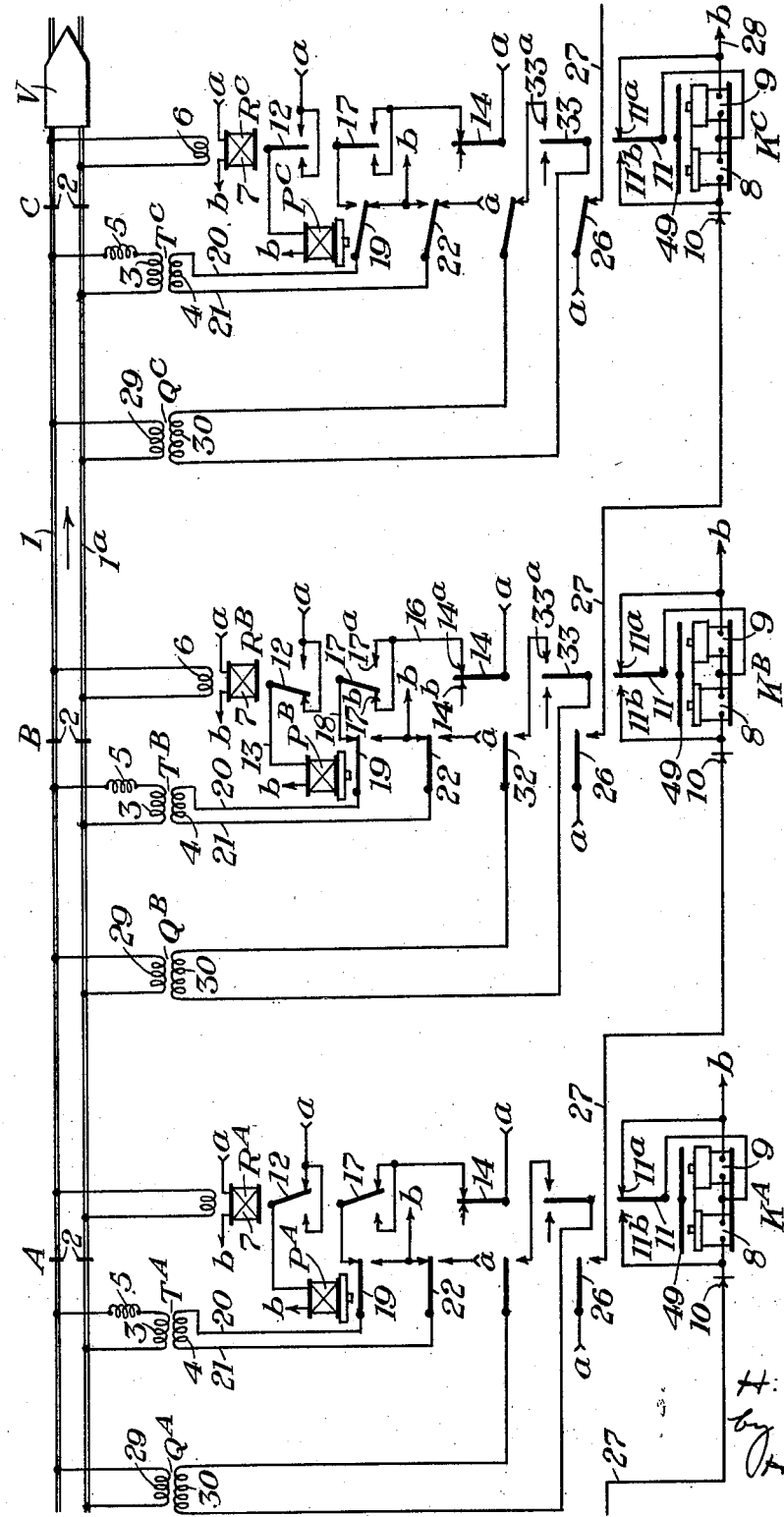

Referring now to Fig. 2, the apparatus is similar to that shown in Fig. 1, but when one of the relays P is de-energized, alternating current is supplied without interruption to the primary 4 of the adjacent transformer T over back contacts 22 and 19 of the repeater relay P.

Each track section is also provided, in Fig. 2, with an auxiliary transformer designated by the reference character Q and comprising a primary 29 connected across the rails at an intermediate point in the section. The secondary 30 of each transformer Q is arranged to be at times periodically short-circuited. Referring, for example, to transformer $Q^B$, the secondary of this transformer is provided with a circuit including back contact 32 of relay $P^B$ and contact 33—33$^a$ of coding relay $K^B$. The contact 33—33$^a$ is normally open but is arrannged to be operated intermittently when the coding relay is energized.

When a coding relay K is transmitting the caution code to the trackway, therefore, each time contact 33—33ª closes, the secondary 30 of the auxiliary transformer Q for that section is short circuited so that substantially no current flows in the rails between the point of connection of the auxiliary transformer Q and the entrance end of the section during this interval of short circuit. As shown in the drawing a train V occupies the section to the right of point C and the parts of the apparatus occupy the same positions as have already been described in connection with Fig. 1.

I will now assume that a train moves through the stretch of track shown in the drawing in the direction indicated by the arrow. When this train enters section A—B relay $K^B$ commences to operate due to the opening of relays $R^A$ and $P^A$, and current is therefore supplied to the rails of section A—B in accordance with the proceed code as explained in connection with Fig. 1 so that the train receives a proceed indication. When the train enters section B—C the coding relay $K^C$ commences to operate but relay $P^C$ is de-energized so that transformer $T^C$ supplies uninterrupted alternating current to the rails of section B—C. But each operation of contact 33—33ª of relay $K^C$ short circuits the secondary 30 of transformer $Q^C$ so that the transformer periodically shunts the rails and the current in that portion of the section between B and $Q^C$ is interrupted in accordance with the caution code. As the train proceeds through section B—C, then, a caution indication is received on board the train between B and $Q^C$, but a stop indication is received on board the train between $Q^C$ and point C.

Figure 3:
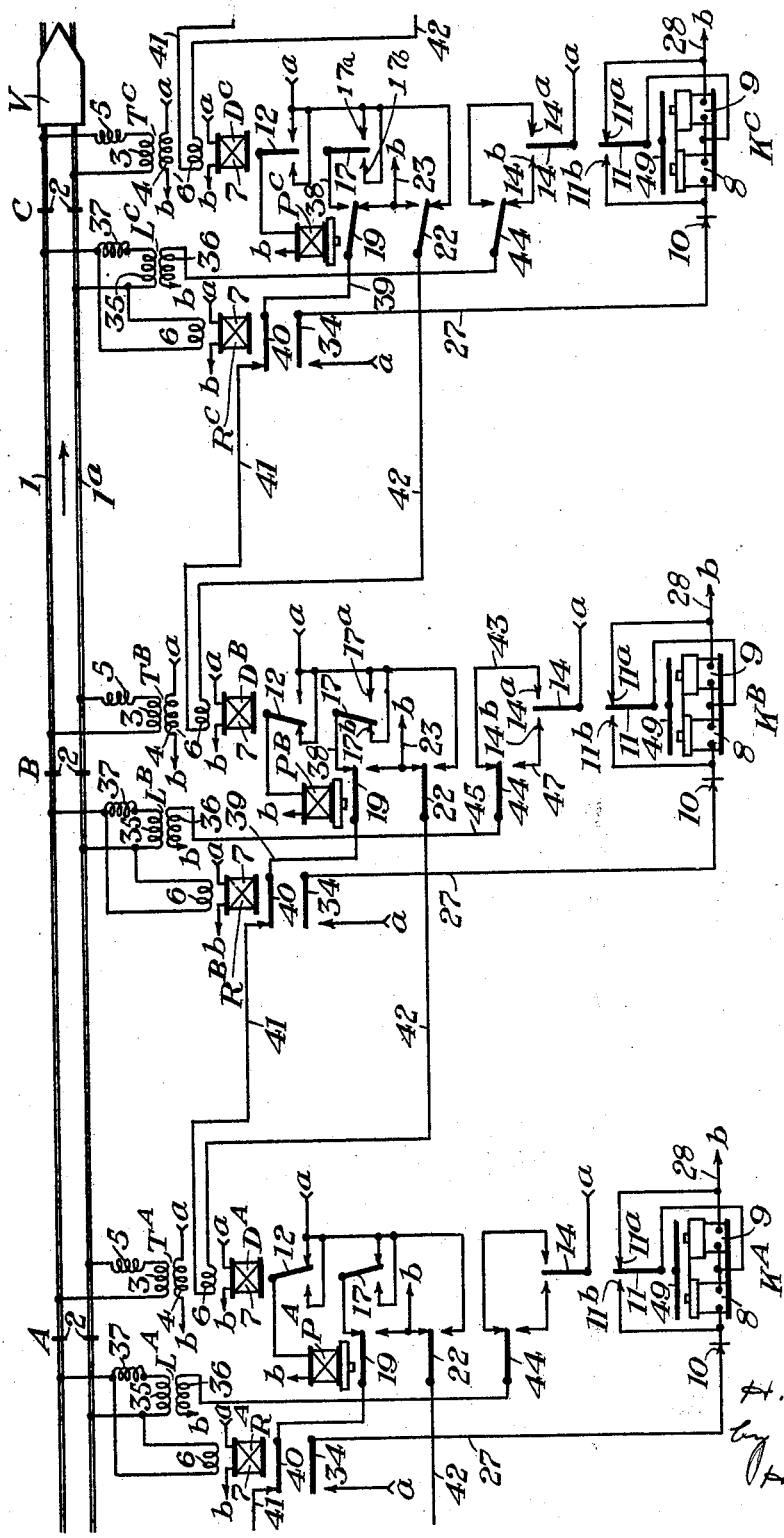

Referring now to Fig. 3, the track transformer T for each section is located at the entrance end of each section and the primary 4 of this transformer is constantly supplied with alternating current from terminals $a$ and $b$ so that the track section is at all times supplied with alternating current from a point adjacent its entrance end. Winding 6 of each track relay is connected across the rails adjacent the exit end of the section. Interrupted current is at times supplied to each section from a point adjacent its exit end from a train controlling transformer designated by the reference character L with an exponent corresponding to the location and having its secondary 35 connected across the rails adjacent the exit end of the section through the usual impedance 37.

Located adjacent the entrance end of each section is a line relay designated by the reference character D with an appropriate distinguishing exponent. Each line relay D comprises two windings 6 and 7, one of which, 7, is constantly supplied with alternating current from terminals $a$ and $b$. Referring particularly to relay $D^B$, winding 6 of this relay is provided with a circuit which may be traced from terminal $a$, through contact 17—17ª of relay $D^C$, wire 38, front contact 19 of relay $P^C$, wire 39, front contact 40 of track relay $R^C$, wire 41, winding 6 of relay $D^B$, wire 42, front contact 22 of relay $P^C$ and wire 23 to terminal $b$. When this circuit is closed, current of normal relative polarity is supplied to relay $D^B$ and the relay is energized in such direction that contacts 12 and 17 swing to the right. When relay $P^C$ is de-energized, however, current flows from terminal $a$, through back contact 22 of relay $P^C$, wire 42, winding 6 of relay $D^B$, wire 41, front contact 40 of relay $R^C$, wire 39, back contact 19 of relay $P^C$ and wire 23 to terminal $b$. When this circuit is closed, current of reverse relative polarity is supplied to winding 6 of relay $D^B$, so that contacts 12 and 17 are swung to their left-hand, or reverse positions. The control of each relay P by the adjacent relay D is similar to the control of the relays P by the associated relays R in Figs. 1 and 2, and will be readily understood from the drawing. The circuit for primary 36 of each transformer L is controlled by the adjacent code relay K, through contacts 14—14ª and 14—14ᵇ, which contacts are normally open but are arranged to close alternately when the relay is operated so that contact 14—14ª is closed for substantially two-thirds of a second and contact 14—14ᵇ is closed for substantially one-third of a second. One circuit for primary 36 of transformer $L^B$, for example, may be traced from terminal $a$, through contact 14—14ª of relay $K^B$, wire 43, front contact 44 of relay $P^B$, wire 45, and primary 36 of transformer $L^B$ to terminal $b$. This circuit is closed when relay $P^B$ is energized, that is, when relay $D^B$ is energized in one direction or the other. When relay $P^B$ is de-energized, a circuit is closed from terminal $a$, through contact 14—14ᵇ of relay $K^B$, wire 47, back contact 44 of relay $P^B$, wire 45, and primary 36 of transformer $L^B$ to terminal $b$. It follows that when relay $K^B$ is being operated, the rails of section A—B are supplied from transformer $L^B$ with code impulse combinations according to the proceed code or the caution sode depending upon whether relay $P^B$ is energized or de-energized.

As shown in the drawings, the section to the right of point C is occupied by a train V, so that the track relay for this section (not shown in the drawings) is de-energized, causing relay $D^C$ to be de-energized. Relay $P^C$ is therefore open so that current of reverse relative polarity is supplied to winding 6 of line relay $D^B$ energizing this relay in the reversed direction. Relay $P^B$ is therefore energized and current of normal relative polarity is supplied to winding 6 of relay $D^A$ picking up this relay in the normal direction. Relays $R^B$ and $R^C$ are energized by current supplied to the associated section from track transformers T located adjacent the entrance ends of the sections. Relays K in the sections illustrated are all de-energized and no current is supplied to the corresponding transformers L.

I will now assume that a train moving in the direction of the arrow moves through the stretch of track shown in the drawings. As this train enters section A—B, relay $R^B$ becomes de-energized. The closing of back contact 34 of relay $R^B$ closes the circuit for coding relay $K^B$ so that the contacts controlled by this relay commence to operate. Relay $P^B$, as has already been explained, is energized so that each time contact 14—14$^a$ of relay $K^B$ is closed an impulse of alternating current is supplied to primary 36 of transformer $L^B$, and therefore to the rails of section A—B. It follows that under these conditions the train receives a code impulse combination in accordance with the proceed code. When the train enters section B—C, relay $R^C$ becomes de-energized, thereby closing, at back contact 34, the operating circuit for the coding relay $K^C$. Relay $P^C$ is de-energized due to the presence of the train V in section to the right of point C so that each time contact 14—14$^b$ of coding relay $K^C$ becomes closed an impulse of alternating current is supplied to the rails of section B—C and the train is therefore supplied with code impulse combinations in accordance with the caution code.

When the train moves out of a section, the track relay R for that section becomes energized during the next time interval between impulses from transformer L, by current from the associated transformer T, thereby opening back contact 34 and de-energizing the coding relay K for that section.

Two-element relays of the type illustrated for the track relays R, usually operate in such manner that the relay picks up when currents of one relative polarity are supplied to the windings of the relay. When the polarity of either of such currents is reversed, the relay will not pick up, but will hold its front contacts open.

The parts are so arranged that current from a transformer L is of such relative polarity as to hold open the front contacts of the associated track relay, and the relay cannot, therefore, be improperly energized due to current from the transformer L when the section is occupied.

Figure 4:
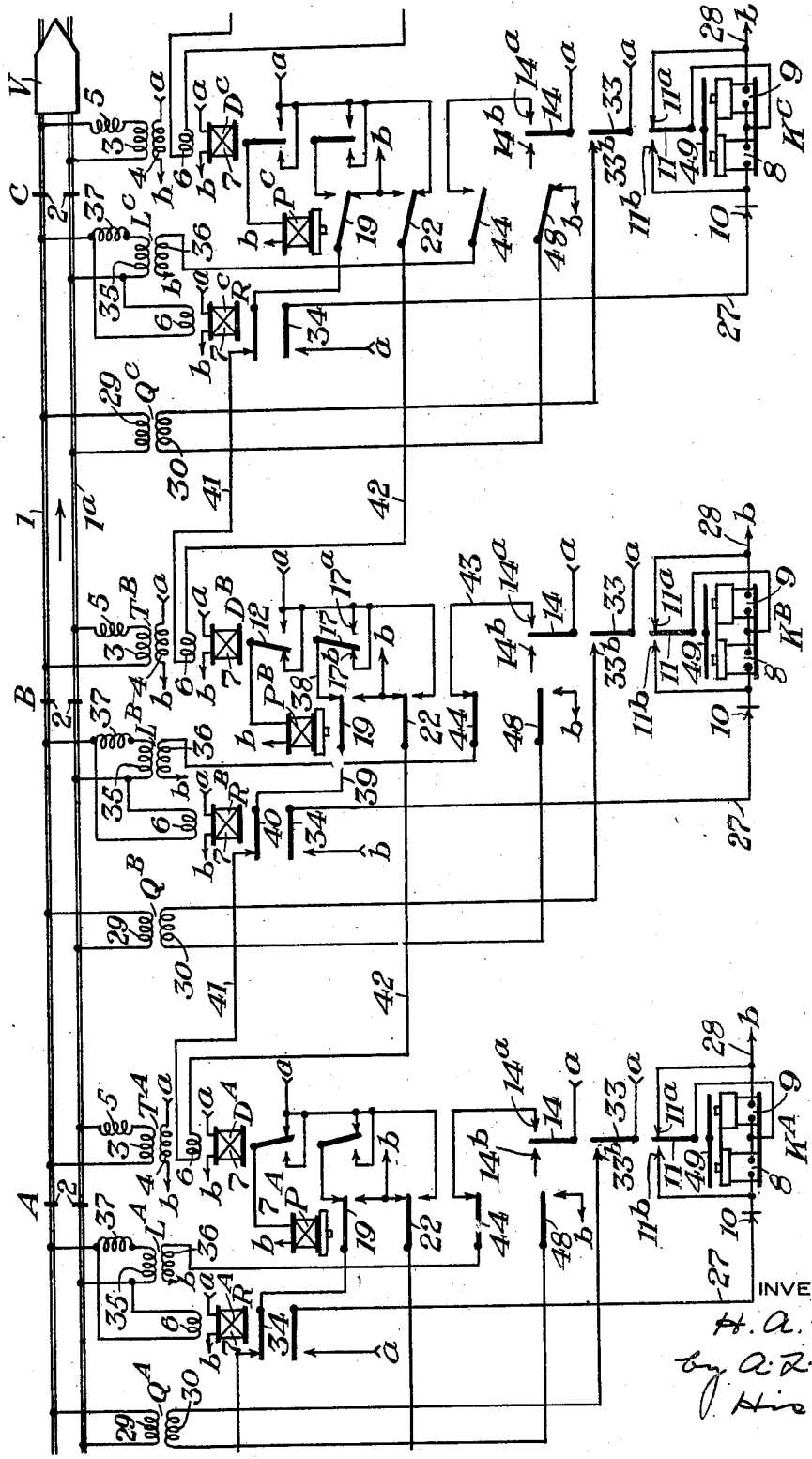

Referring now to Fig. 4, the trackway apparatus illustrated in this view is similar to that just described in connection with Fig. 3, except that the caution code is transmitted to the trackway at an intermediate point in the section by a transformer Q. In Fig. 4, referring for example, to section A—B, when relay $P^B$ is energized and relay $K^B$ is being operated, current is supplied to transformer $L^B$ over front contact 44 of relay $P^B$ and contact 14—14$^a$ of relay $K^B$. Under these conditions the rails of section A—B are supplied with current according to the proceed code. When relay $P^B$ is de-energized however, the circuit for transformer $L^B$ is opened and current is supplied to primary 30 of transformer $Q^B$ over contact 33—33$^b$ of relay $K^B$ and back contact 48 of relay $P^B$. The rails of section A—B are then supplied with the caution code from transformer $Q^B$.

As shown in the drawing the section to the right of point C is occupied by train V and the condition of the apparatus will be readily understood from the explanation of Fig. 3. When a train moving in the direction of the arrow passes through the stretch of track shown in the drawings the operation of the apparatus located at point B is the same as in Fig. 3 and the train receives a proceed indication throughout section A—B. When this train enters section B—C, relay $R^C$ becomes de-energized, thereby completing the circuit for coding relay $K^C$ at back contact 34 of this relay and setting the coding relay into operation. Relay $P^C$ is de-energized due to the presence of a train V in the section to the right of point C so that the supply of current to transformer $L^C$ is interrupted at front contact 44 of relay $P^C$. Back contact 48 of relay $P^C$ is closed so that each time contact 33 swings to the left so that contact 33—33$^b$ is closed an impulse of energy is supplied to the secondary 30 of transformer $Q^C$. It follows that the train will be supplied with the caution code between the entrance end of section B—C and transformer $Q^C$. When the train is between transformer $Q^C$ and point C, it is deprived of alternating current from the trackway due to the shunting effect of the wheels and axles of the train and the train receives a stop indication.

Figure 5:
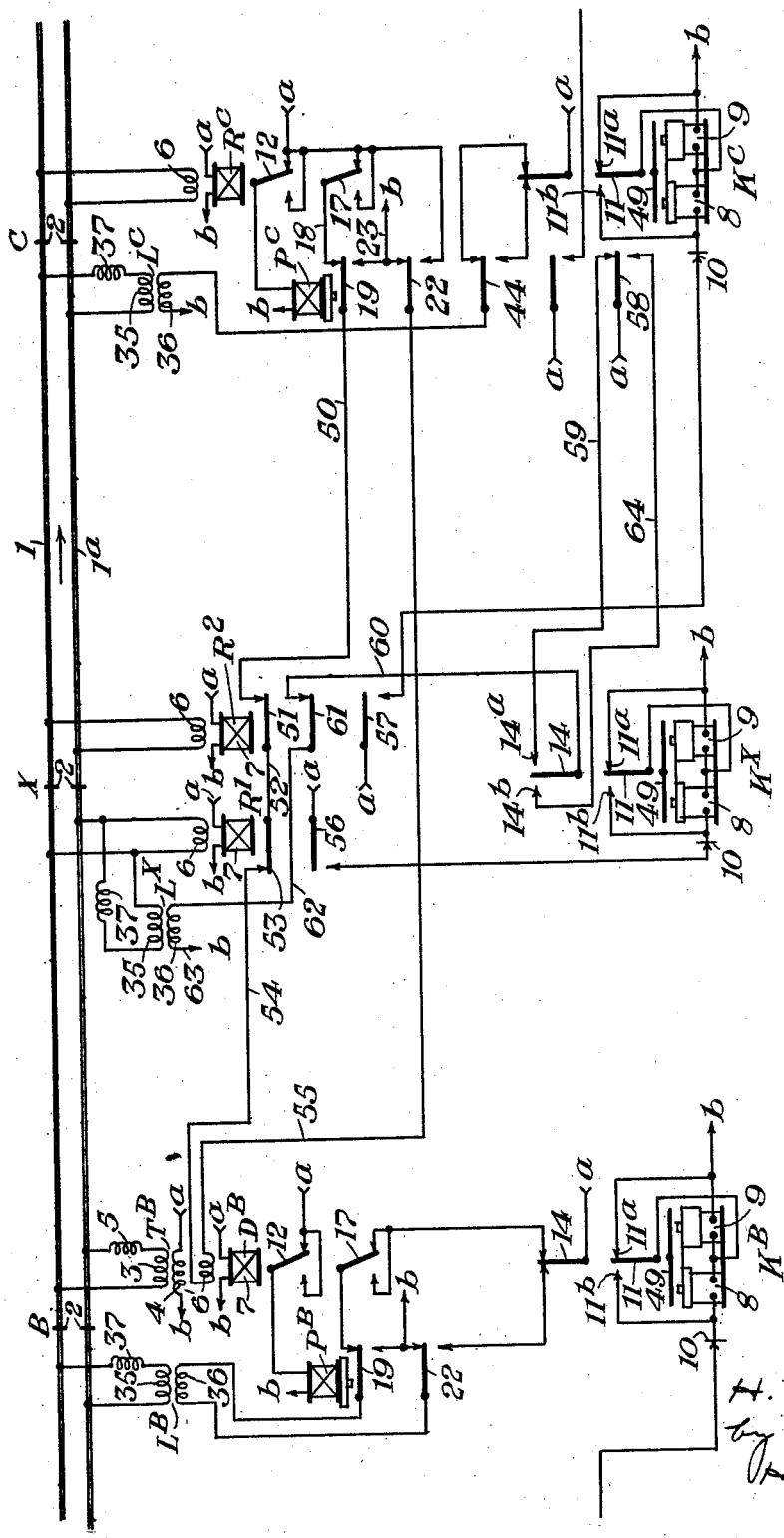

Under some conditions of operation it may be desirable to divide a track section by means of insulated joints 2 into two or more sub-sections. In Fig. 5, for example, section B—C is divided into a forward sub-section X—C and a rear sub-section B—X. Winding 6 of track relay $R^C$ is connected across the rails adjacent the entrance end of the section to the right of point C and secondary 35 of transformer $L^C$ is connected across the rails adjacent the exit end of section B—C. Two track relays $R^1$ and $R^2$ similar to relay $R^C$ have their windings 6 connected across the rails on opposite sides of point X and the transformer $L^X$ has its secondary 35 connected across the rails adjacent the exit end of sub-section B—X. Alternating current is constantly supplied to sub-section B—X adjacent the entrance end of this sub-section by transformer $T^B$. A line relay $D^B$ located at point B is controlled by the track relays $R^C$, $R^1$ and $R^2$, and by the repeater relay $P^C$ so that if relays $R^C$, $R^1$ and $R^2$ are energized this line relay is supplied with current of one relative polarity or the other according as relay $P^C$ is energized or de-energized. One circuit for relay $D^B$ may be traced from terminal $a$ through contact 17 of relay $R^C$, wire 18, front contact 19 of relay $P^C$, wire 50, front contact 51 of relay $R^2$, wire 52, front contact 53 of relay $R^1$, wire 54, winding 6 of relay $D^B$, wire 55, front contact 22 of relay $P^C$ and wire 23 to terminal $b$. When this circuit is closed, current of normal relative polarity is supplied to winding 6 of relay $D^B$ and the normal contacts of this relay are closed. Under these conditions relay $P^B$ is energized and current of normal relative polarity is supplied to the rails of the section to the left of point B through transformer $L^B$ as explained in connection with Fig. 1. When relay $P^C$ is de-energized current flows from terminal $a$, through back contact 22 of relay $P^C$, wire 55, winding 6 of relay $D^B$, wire 54, front contact 53 of relay $R^1$, wire 52, front contact 51 of relay $R^2$, wire 50, back contact 19 of relay $P^C$, and wire 23 to terminal $b$. When this circuit is closed, current of reverse relative polarity is supplied to winding 6 of relay $D^B$ so that the reverse contacts of the relay are closed. When relay $D^B$ is de-energized as by the presence of a train in section B—C, relay $P^B$ becomes de-energized and current of reverse polarity is supplied to the rails of the section to the left of point B. A coding relay $K^B$ is located at point B and is controlled as shown in Fig. 1 so that this relay operates, when the section to the left of point B is occupied, to interrupt the current supplied to the rails of such section in accordance with the caution or proceed code depending upon the condition of relay $P^B$. It will be plain that the control of the apparatus for the section to the left of point B is similar to the control of the corresponding apparatus in Fig. 1 except that relay D is substituted for relay R in the control of this apparatus.

A coding relay $K^C$ is provided with a circuit including back contact 57 of relay $R^2$ so that this relay operates when section X—C is occupied. In similar manner coding relay $K^X$ is controlled by back contact 56 of relay $R^1$ so that this relay operates when sub-section B—X is occupied. Relay $K^C$ is controlled as in Fig. 3 to interrupt the current supplied to primary 36 of transformer $L^C$ in accordance with the proceed or caution code according as relay $P^C$ is energized or de-energized. The relay $K^X$, in conjunction with relay $P^C$, controls the supply of current to transformer $L^X$. Thus, when relay $P^C$ is energized, current flows from terminal $a$, through front contact 58 of relay $P^C$, wire 59, contact 14—14$^a$ of relay $K^X$, wire 60, front contact 61 of relay $R^2$, wire 62, primary 36 of transformer $L^X$ and wire 63 to terminal $b$. When relay $P^C$ is de-energized however, current flows from terminal $a$, through back contact 58 of relay $P^C$ wire 64, contact 14—14$^b$ of relay $K^X$, wire 60, front contact 61 of relay $R^2$, wire 62, primary 36 of transformer $L^X$ and wire 63 to terminal $b$. It is manifest therefore that when relay $R^2$ is energized and when relay $K^X$ is operated, sub-section B—X is supplied with the proceed code if relay $P^C$ is energized but that sub-section B—X is supplied with the caution code if relay $P^C$ is de-energized.

As shown in the drawing the stretch of track is unoccupied and relay $R^C$ is energized in the normal direction. Relay $P^C$ is therefore energized. Current is supplied to the primary of transformer $L^C$ over front contact 44 of relay $P^C$ so that relay $R^2$ is energized, and back contact 57 is open. Relay $K^C$ is therefore de-energized. Current is constantly supplied to sub-section B—X from transformer $T^B$, energizing relay $R^1$, so that the circuit for coding relay $K^X$ is open at back contact 56 of relay $R^1$. Relay $D^B$ is therefore energized in the normal direction and relay $P^B$ is energized so that current of normal relative polarity is supplied to the section to the left of point B. If a train moving in the direction of the arrow enters section B—X, the resulting de-energization of relay $R^1$ sets coding relay $K^X$ into operation. Relays $P^C$ and $R^2$ remain energized so that the operation of relay $K^X$ supplies current to primary 36 of transformer $L^X$ in accordance with the proceed code. If relay $P^C$ were de-energized, as by the presence of a train in the section to the right of point C, the circuit for primary 36 of transformer $L^X$ would include contact 14—14$^b$ of relay $K^X$ so that sub-section B—X would then be supplied in accordance with the caution code.

Returning to the assumption that relay $P^C$ is energized, when the train enters sub-section X—C, relay $R^2$ becomes de-energized, setting relay $K^C$ into operation. Current is therefore supplied to the rails of the sub-section X—C through transformer $L^C$ in accordance with the proceed code. If relay $P^C$ were de-energized the current supplied to the rails of the sub-section would be interrupted in accordance with the caution code.

It will be seen therefore that when relay $P^C$ is energized a train proceeding through the sub-section B—X is supplied with current according to the proceed code from transformer $L^X$ and when proceeding through the sub-section X—C is supplied with current according to the proceed code from transformer $L^C$. When relay $P^C$ is de-energized, however, the train in section B—X receives current according to the caution code from transformer $L^X$ and when in sub-section X—C receives current according to the caution code from transformer $L^C$.

In the modification illustrated in Fig. 6, each section is provided with a track relay R, a repeater relay P, and a coding relay K controlled in the same manner as explained in connection with Fig. 1. Current is supplied to the rails of the section from a transformer L located adjacent the exit end of the section. Current is at times supplied to primary 36 of each transformer L from one or the other of two sources of alternating current of different frequencies. For this purpose each section is provided with two transformers designated by the reference characters O and S, respectively, with exponents corresponding to the location. The primary 68 of each transformer O is constantly supplied with alternating current of one frequency from an alternator M, over a transmission line 81. The train carried apparatus is arranged to respond only to current of this frequency in the track rails. For other purposes such as the energization of the track relays and the line circuits current is supplied from a second alternator N at a different frequency to the primary 70 of each transformer S over transmission line 82. Although any suitable frequencies may be chosen for alternators M and N, for purposes of explanation I will assume that the frequency of the current supplied by alternator M is 100 cycles per second and that the frequency of the current supplied by alternator N is 60 cycles per second. As shown in the drawing the section to the right of point C is occupied by train V. Relays $R^c$ and $P^c$ are therefore de-energized, and 60-cycle current of reverse relative polarity is therefore supplied from transformer $S^c$ to primary 36 of transformer $L^c$, over contact 14—14$^a$ of relay $K^c$, and back contacts 22 and 19 of relay $P^c$. Relay $R^B$ is therefore energized in the reverse direction and relay $P^B$ is picked up. 60-cycle current of normal relative polarity is therefore supplied to primary 36 of transformer $L^B$ from transformer $S^B$ over contact 14—14$^b$ of relay $K^B$, contacts 16 and 17 of relay $R^B$, and front contacts 19 and 22 of relay $P^B$ so that relay $R^A$ is picked up in the normal direction and relay $P^A$ is also energized. I will now assume that a train moving in the direction of the arrow passes through the stretch of track shown in the drawing. When this train enters section A—B, the resulting de-energization of relay $P^A$ energizes coding relay $K^B$. Each time contact 33—33$^a$ of relay $K^B$ is closed, a surge of 100-cycle current flows from secondary 67 of transformer $O^B$, through wire 71, contact 33—33$^a$ of relay $K^B$, wire 72, front contact 65 of relay $P^B$, wires 73 and 74, primary 36 of transformer $L^B$, and wires 75, 76 and 77, back to secondary 67 of transformer $O^B$. When this circuit is closed, contact 14—14$^b$ is open so that the supply of 60-cycle current to transformer $L^B$ is interrupted. When the contacts of relay $K^B$ swing to the left the circuit just traced for secondary 67 of transformer $O^B$ is open and the circuit is re-established for the supply of 60-cycle current from secondary 69 of transformer $S^B$ to primary 36 of transformer $L^B$.

It follows, therefore, that section A—B is supplied with 100-cycle current in the form of impulses of energy of two-thirds of a second duration separated by time intervals of one-third of a second and that during each interval of one-third of a second, 60-cycle current is supplied to the trackway, that is to say, the rails are supplied with alternate impulses of 60-cycle current and 100-cycle current the latter being interrupted in accordance with the proceed code to give a proceed indication on the train.

When the train enters section B—C relay $K^c$ commences to operate. Each time the contacts of this relay swing to the left contact 14—14$^a$ opens, thereby interrupting the circuit over which 60-cycle current is supplied to primary 36 of transformer $L^c$. At the same time however contact 33—33$^b$ of relay $K^c$ closes and 100-cycle current flows from secondary 67 of transformer $O^c$, through wire 71, contact 33—33$^b$ of relay $K^c$, wire 78, back contact 66 of relay $P^c$, wire 79, primary 30 of transformer $Q^c$, and wires 80 and 77 back to secondary 67 of transformer $O^c$. Under these conditions, therefore, 100-cycle current is supplied to section B—C at the point of connection of transformer $Q^c$ in the form of impulses each of one-third of a second duration separated by time intervals of two-thirds of a second duration, during which intervals 60-cycle current is supplied to the rails of the section at transformer $L^c$. It follows that between point B and the point of connection of transformer $Q^c$, the rails are supplied with alternate impulses of 100-cycle and 60-cycle currents of which the 100-cycle current is interrupted in accordance with the caution code, but that between the point of connection of transformer $O^c$ and point C, the rails are supplied with interrupted 60-cycle current but with no 100-cycle current. The train therefore receives a caution indication between point B and the transformer $Q^c$, and a stop indication between transformer $Q^c$ and point C. After the train has passed out of section A—B, the next impulse of 60-cycle current picks up relay $R^A$, which in turn picks up relay $P^A$, thereby de-energizing relay $K^B$. With relay $K^B$ deenergized, uninterrupted 60-cycle current is supplied to the rails of section A—B as will be plain from the drawings. The operation of the apparatus as the train passes out of section B—C will be readily understood from the foregoing.

Figure 7:
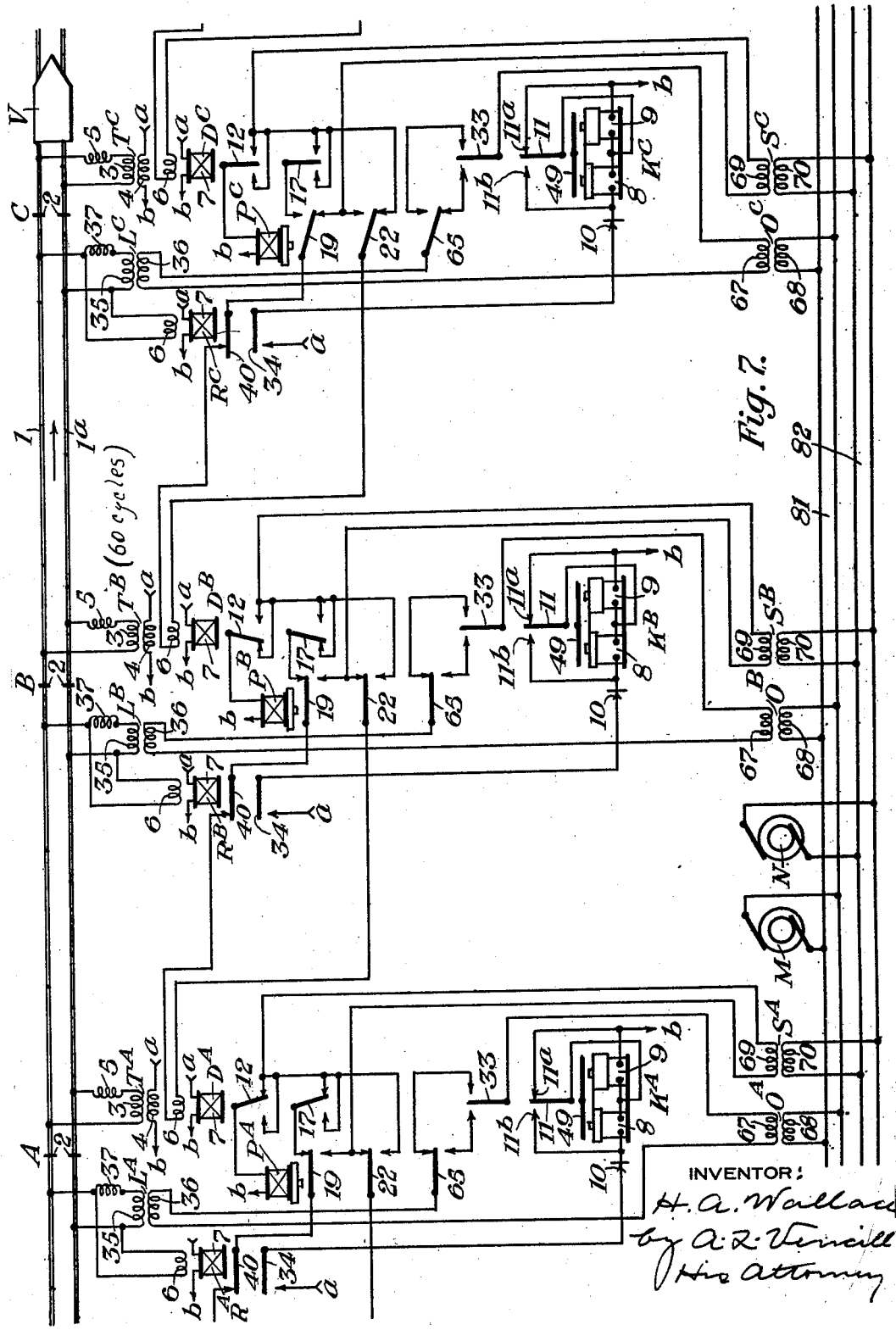

In the modification illustrated in Fig. 7, 60-cycle current is constantly supplied to the rails of each section from transformer T, located adjacent the entrance end of the section. The control of the coding relay K, the track relay R, the line relay D and the repeater relay P for each section is similar to the control of the corresponding parts in Fig. 3 and will be readily understood from the explanation of that view. 100-cycle current is at times supplied to the rails of each section by means of a transformer L located adjacent the exit end of the section. Referring for example to section A—B, if this section were occupied by a train so that relay $R^B$ were de-energized to complete the circuit for relay $K^B$, 100-cycle current would be supplied to primary 36 of transformer $L^B$, each time contact 33 swung to the right. Under these conditions the rails of section A—B would be supplied with 100-cycle current interrupted in accordance with the proceed code.

Similarly, I will assume that section B—C is occupied by a train so that relay $K^C$ is operated. Under these conditions 100-cycle current is supplied over contact 33—$33^b$ of relay $K^C$ and back contact 65 of relay $P^C$ to primary 36 of transformer $L^C$ each time the contacts of coding relay $K^C$ swing to the left. Under these conditions therefore the rails of section B—C are supplied with 100-cycle current periodically interrupted in accordance with the caution code.

Figure 8:
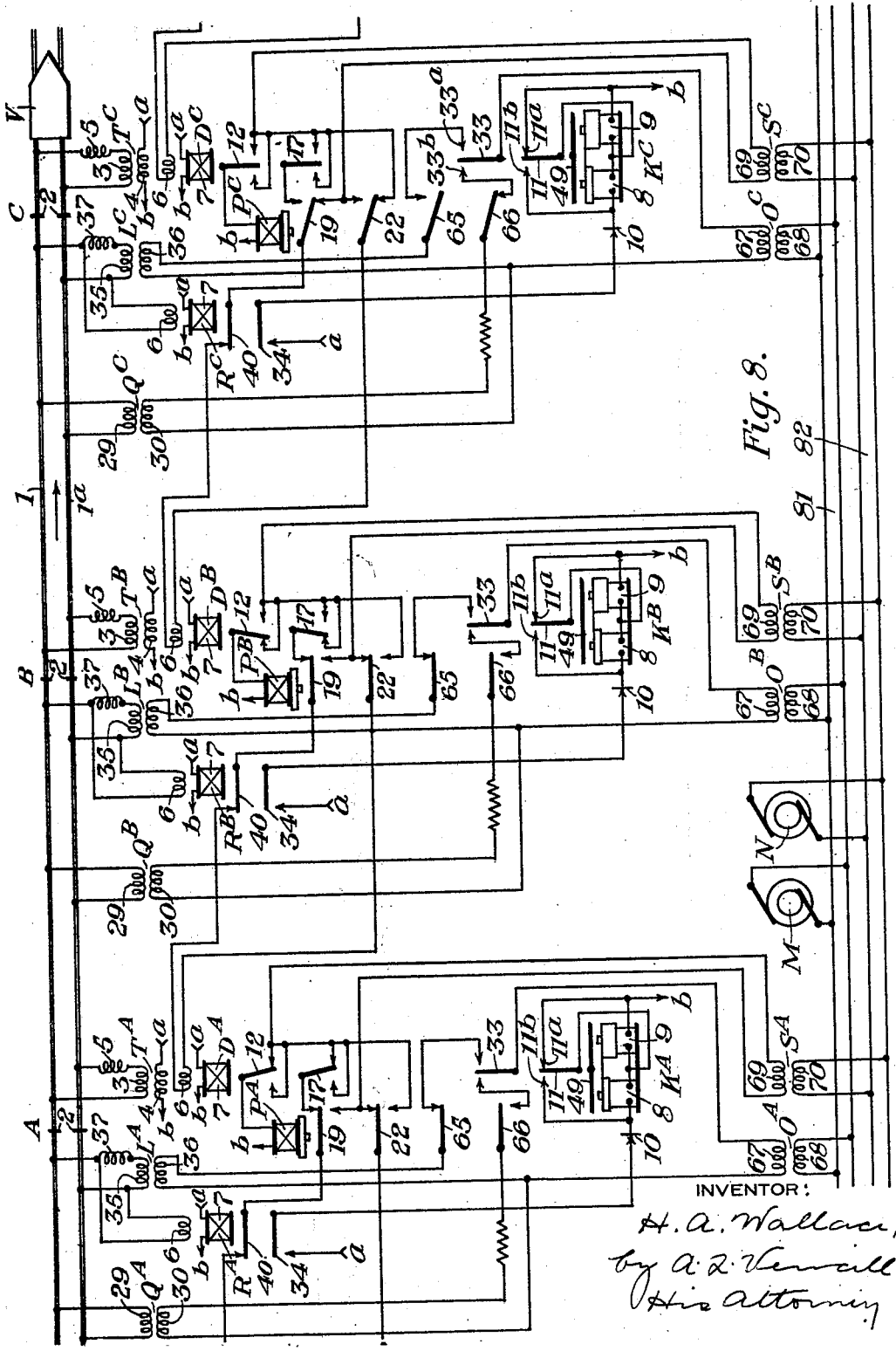

The trackway circuits shown in Fig. 8 are similar to those just described in Fig. 7 except that when a repeater relay P is de-energized and the corresponding coding relay is energized, 100-cycle current is supplied to the associated section at transformer Q connected at an intermediate point in the section as in Fig. 6 instead of at the exit end of the section as in Fig. 7. Referring to the apparatus located at point C, when relay $P^C$ is energized and relay $K^C$ is energized, 100-cycle current is supplied to the primary 36 of transformer $L^C$, over contact 33—$33^a$ of coding relay $K^C$ and front contact 65 of relay $P^C$ in exactly the same manner as in Fig. 7. When relay $P^C$ is de-energized however, current flows from secondary 67 of transformer $O^C$, through contact 33—$33^b$ and back contact 66 of relay $P^C$ to primary 30 of transformer $Q^C$ each time the contacts of relay $K^C$ swing to the left. Under these conditions therefore the rails of section B—C are supplied at transformer $Q^C$ with interrupted 100-cycle current in accordance with the caution code.

Referring now to Fig. 9, the apparatus here shown comprises two parallel stretches of railway track $d$ and $e$. Stretch $e$ is divided into two track sections G—H and H—J by means of insulated joints 2. The portion of track $d$ which is opposite sections G—H and H—J is insulated from the rest of track $d$ by insulated joints 2 to form a track section E—F. Section G—H is connected with section E—F by means of a cross-over designated in general by the reference character $g$ connected with the sections by means of switches which are operated by means not shown in the drawing and forming no part of the present disclosure. A circuit controller designated by the reference character $W^g$ is controlled in accordance with the positions of the switches which connect the cross-over $g$ with the two track sections. The position of the switches of cross-over $g$ for which the circuit controller $W^g$ is closed is indicated in the wiring diagram by small letters inclosed by circles which are in turn designated by the reference character $W^g$. For example, on the left-hand side of the sheet close to relay $Z^G$ are two contacts on circuit controller $W^g$. The upper one of these contacts is indicated by a circle inclosing the letter R and the lower contact is indicated by a circle containing the letter N. The symbols mean that the lower or normal contact N is closed when the switches of cross-over $g$ are in their normal positions, that is, when these switches are in such position that traffic can proceed without interference through section G—H. When the switches of this cross-over occupy their reverse positions, however, to permit traffic to move from section G—H into section E—F over the cross-over $g$, the other or reverse contact designated by the reference character R is closed.

In similar manner a cross-over $h$ connects section E—F with section H—J, and the switches which connect this cross-over with the associated sections control a circuit controller $W^h$. The contacts of this circuit controller are designated on the drawing by symbols similar to those just explained in connection with the circuit controller $W^g$. It will be noticed that certain of the contacts of circuit controllers $W^g$ and $W^h$ are marked "CR". This means that the contacts so designated are closed when the associated switches are in the reverse position, and remain closed when the switch moves away from the reverse position toward the normal position until the switch is past the center or "C" position. In similar manner contacts marked "CN" are closed when the switch is in the center position, the normal position or any position between these two.

Current is at times supplied to the rails of each section of tracks $d$ and $e$ by means of a transformer designated by the reference character T with an appropriate distinguishing exponent and having its secondary 3 connected across the rails adjacent the exit end of the corresponding section in series with the usual impedance 5. Current is at times supplied to the primaries 4 of these transformers by means which I will describe hereinafter. Each section is further provided with a track relay designated by the reference character R with an exponent corresponding to the location and connected across the rails adjacent the entrance end of each track section.

Traffic entering stretch $d$ is governed by a trackway signal $r^E$ and traffic entering stretch $e$ is governed by a similar trackway signal $r^G$. As shown in the drawing each of these signals $r$ is located adjacent the entrance end of the stretch of track which it governs, and comprises a semaphore arm capable of assuming three positions to indicate "proceed", "caution" or "stop", but this particular location and form are not essential to my invention. In actual practice the signals $r$ will usually be controlled manually from a remote point such as an interlocking cabin so that they normally indicate stop but can be caused to indicate caution or proceed when the operator in the cab wishes to permit traffic to enter the stretch of track governed by these signals. When a train moving in a direction in which the signal governs passes the signal, the indication of the signal immediately changes to a stop indication. Associated with each of the trackway signals $r$ is a circuit controller designated by the reference character U with an exponent corresponding to the associated signal and arranged to be closed only when the corresponding signal indicates proceed.

Associated with each track relay R is a stick relay designated by the reference character Z with a distinguishing exponent. Referring particularly to stick relay $Z^G$, this relay is provided with a pick-up circuit which may be traced from terminal $a$, through back contact 94 of track relay $R^G$, wires 95 and 96, circuit controller $U^g$ controlled by signal $r^G$, wires 97 and 98, winding of relay $Z^G$ and wire 99 to terminal $b$. This circuit is closed only if relay $R^G$ becomes deenergized when signal $r^G$ indicates proceed. But if the de-energization of relay $R^G$ results from the entrance of a train into section G—H, signal $r^G$ goes to stop as soon as the train passes the signal, thereby opening circuit controller $U^g$ and interrupting the pick-up circuit just traced. The relay $Z^G$, having once been picked up, is maintained in its energized condition over a stick circuit which passes from terminal $a$, through back contact 94 of relay $R^G$, wires 95 and 100, front contact 101 of relay $Z^G$, wires 102 and 98, winding of relay $Z^G$ and wire 99 to terminal $b$. Relay $Z^G$ having once been energized, therefore, is maintained in its energized condition as long as relay $R^G$ remains de-energized.

Stick relay $Z^E$ is provided with one pick-up circuit which may be traced from terminal $a$, through back contact 83 of relay $R^E$, wires $83^a$ and 84, circuit controller $U^E$, wires 85 and 86, winding of relay $Z^E$ and wire 87 to terminal $b$. The relay is also provided with a second pick-up circuit which may be traced from terminal $a$, through a reverse contact on circuit controller $W^g$, wire 91, front contact 92 of relay $Z^G$, wires 93, 90 and 86, winding of relay $Z^E$ and wire 87 back to terminal $b$. Relay $Z^E$ therefore becomes energized if a train enters section E—F with signal $r^E$ at proceed or if relay $Z^G$ becomes energized, as by the entrance of a train into section G—H, when the switches of cross-over $g$ are reversed to permit this train to run into section E—F. Having once been energized, relay $Z^E$ is maintained in its energized condition as long as relay $R^E$ is de-energized, by virtue of a stick circuit which passes from terminal $a$, through back contact 83 of relay $R^E$, wires $83^a$ and 88, front contact 89 of relay $Z^E$, wires 90 and 86, winding of relay $Z^E$ and wire 87 to terminal $b$.

If the train enters section H—J with relay $Z^E$ energized and the switches of cross-over $h$ reversed, as is the case when the train enters the section from section E—F over the crossover, relay $R^H$ becomes de-energized and current flows from terminal $a$, through back contact 103 of track relay $R^H$, wire 104, a reverse contact on circuit controller $W^h$, wire 105, front contact 106 of relay $Z^E$, wires 107, 108, and 109, winding of relay $Z^H$ and wire 110 back to terminal $b$ thereby picking up relay $Z^H$. Similarly, if a train enters section H—J from section G—H with the switches of cross-over $g$ in their normal positions and relay $Z^G$ energized, the de-energization of relay $R^H$ completes a circuit from terminal $a$, through back contact 103 of relay $R^H$, wires 104 and 111, a normal contact on circuit controller $W^g$, wire 112, front contact 113 of relay $Z^G$, wires 114, 108 and 109, winding of relay $Z^H$ and wire 110 to terminal $b$. Having once been energized over either of the pick-up circuits just traced, relay $Z^H$ is subsequently held in its energized condition as long as relay $R^H$ remains re-energized, current then flowing from terminal $a$, through back contact 103 of track relay $R^H$, wires 104, 111, and 115, front contact 116 of relay $Z^H$, wires $116^a$ and 109, winding of relay $Z^H$ and wire 110 to terminal $b$.

Associated with each stick relay Z is a coding relay K arranged to be energized when the front contact 117 of the corresponding stick relay is closed. Each of the coding relays K is constructed as explained in connection with the preceding figures.

As shown in the drawing, relays $R^J$ and $R^F$ are energized, the switches of cross-overs $g$ and $h$ are in their normal positions and signals $r^G$ and $r^E$ are indicating stops. A circuit is therefore closed from terminal $a$, through front contact 118 of relay $R^F$, wire 119, a "CN" contact of circuit controller $W^g$, wire 133, a "CN" contact on circuit controller $W^h$, wire 120, contact 14—$14^a$ of coding relay $K^F$, wire 121, and primary 4 of track transformer $T^F$ to terminal $b$. Current is therefore supplied to the rails of section E—F by transformer $T^F$. Relay $R^E$ is energized so that relay $Z^E$ is de-energized. The circuit for coding relay $K^F$ is open at front contact 117 of relay $Z^E$, so that the coding relay is de-energized and contact 14—$14^a$ is continuously closed. It follows that the current supplied to the track rails of section E—F under these conditions is uninterrupted. The circuit for transformer T$^J$ may be traced from terminal $a$, through front contact 122 of relay R$^J$, wire 123, a "CN" contact on circuit controller W$^h$, wire 124, contact 14—14$^a$ of coding relay K$^J$, wire 125, and primary 4 of transformer T$^J$ to terminal $b$. The current thus supplied to the rails of section H—J energizes relay R$^H$ so that relay Z$^H$ is de-energized and relay K$^J$ is also de-energized. Contact 14—14$^a$ of this coding relay is therefore continuously closed and the current supplied to the section H—J is uninterrupted. Another circuit is closed from terminal $a$, through front contact 122 of relay R$^J$, wire 123, a "CN" contact on circuit controller W$^h$, wire 126, a "CN" contact on circuit controller W$^g$, wire 127, contact 14—14$^a$ of coding relay K$^H$, wires 128 and 129, front contact 130 of relay R$^H$, wire 131, a "CN" contact on circuit controller W$^g$, wire 132, and primary 4 of transformer T$^H$, back to terminal $b$. It will be seen that this circuit is closed only when the switches for cross-overs $g$ and $h$ both occupy their normal positions and when relays R$^H$ and R$^J$ are both energized. The current thus supplied to section G—H by transformer T$^H$ energizes relay R$^G$. Relay Z$^G$ is therefore deenergized and coding relay K$^H$ is also de-energized. Contact 14—14$^a$ of relay K$^H$ is therefore continuously closed and the current supplied to the rails of section G—H is uninterrupted.

I will now assume that signal $r^E$ is moved to the proceed position and that a train moving from left to right passes along stretch $d$. When this train enters section E—F, relay R$^E$ becomes de-energized and a pick-up circuit is closed for relay Z$^E$, over circuit controller U$^E$, thereby energizing the relay Z$^E$. The closing of front contact 117 of this relay energizes relay K$^F$, so that contact 14—14$^a$ of relay K$^F$ is operated intermittently. The circuit for primary 4 of transformer T$^F$ is therefore periodically interrupted so that current is supplied to section E—F in accordance with the proceed code. The signal $r^E$ moves to the stop indication as soon as the train enters the section but relay Z$^E$ is now held energized over its stick circuit so that the proceed code is supplied to the train as it moves through the section. When the train leaves section E—F relay R$^E$ picks up, breaking the stick circuit for relay Z$^E$ and de-energizing this relay. Relay K$^F$ therefore becomes de-energized and the interruptions in the current supplied to section E—F cease. With the train in the section to the right of point F, relay R$^F$ is de-energized so that current flows from terminal $a$, through back contact 118 of relay R$^F$, wire 134, a "CN" contact on circuit controller W$^g$, wire 135, a "CN" contact on circuit controller W$^h$, wire 136, contact 14—14$^b$ of relay K$^F$, wire 121, and primary 4 of transformer T$^F$ to terminal $b$. If, now, a second train enters section E—F, passing signal $r^E$ at proceed, relay Z$^E$ is again picked up and held up over its stick circuit after signal $r^E$ is returned to its stop indication. The energization of relay K$^F$ resulting from the closing of contact 117 of relay Z$^E$ causes contact 14—14$^b$ to operate intermittently so that the circuit just traced for primary 4 of transformer T$^F$ is periodically interrupted and current is then supplied to section E—F in accordance with the caution code.

I will now assume that the switches of cross-over $h$ are reversed so that traffic is permitted to move from section E—F into section H—J. All "R" contacts and "CR" contacts on circuit controller W$^h$ are therefore closed and all "N" contacts and "CN" contacts are open. Current now flows from terminal $a$, through a "CR" contact on circuit controller W$^h$, wires 137 and 136, contact 14—14$^b$ of relay K$^F$, wire 121, and primary 4 of transformer T$^F$, back to terminal $b$. Current is also supplied to transformer T$^J$, over a circuit which may be traced from terminal $a$ through a "CR" contact on circuit controller W$^h$, wires 139, 140 and 141, contact 14—14$^b$ of relay K$^J$, wire 125, and primary 4 of transformer T$^J$ to terminal $b$. If now a train enters section E—F, passing signal $r^E$ at proceed, relay Z$^E$ becomes energized as before and relay K$^F$ operates to interrupt the supply of current to the primary 4 of transformer T$^F$ in accordance with the caution code. The train is therefore supplied with a caution code from transformer T$^F$ as far as the cross-over $h$. The energization of relay Z$^E$ completed at front contact 106 a pick-up circuit for relay Z$^H$ so that this relay is energized, thereby completing the operating circuit for relay K$^J$. When the train proceeds over the cross-over $h$, entering section H—J, and shunts relay R$^H$, the closing of the back contact 103 of relay R$^H$ completes the stick circuit for relay Z$^H$ so that the coding relay K$^J$ continues to operate until the train passes out of section H—J. The operation of the relay K$^J$ interrupts the current supplied to transformer T$^J$ in accordance with the caution code. It follows that when the switches of cross-over $h$ are reversed to permit movements from point E to point J, a caution indication is received on board a train passing along this route irrespective of the condition of the track relays connected with the rails to the right of points F and J.

I will next assume all the switches are normal, that relays R$^J$ and R$^F$ are energized, that signal $r^G$ indicates proceed, and that a train moving in the direction of the arrow passes this signal moving along the track $e$. The de-energization of relay R$^G$ completes the pick-up circuit for relay Z$^G$ which thereupon becomes energized and completes the stick circuit for this relay over its own front contact 101 and back contact 94 of relay R$^G$. The closing of front contact 117 of relay Z$^G$ energizes the coding relay $K^H$ so that contact 14—14$^a$ of this relay operates intermittently to periodically interrupt the circuit hereinbefore traced for primary 4 of transformer $T^H$. Current is therefore supplied to the rails of section G—H in accordance with the proceed code. When the train enters section H—J the de-energization of relay $R^H$ completes a pick-up circuit for relay $Z^H$ over an "N" contact on circuit controller $W^g$ and front contact 113 of relay $Z^G$. Relay $Z^H$ therefore becomes energized and is maintained in its energized condition as long as relay $R^H$ is de-energized by virtue of a stick circuit over front contact 116 of the relay $Z^H$ and back contact 103 of relay $R^H$. Relay $K^J$ is therefore energized and contact 14—14$^a$ of this relay operates intermittently to interrupt the supply of current to the primary 4 of transformer $T^J$ in accordance with the proceed code. Under these conditions therefore when the train is in section G—H it is supplied with the proceed code from transformer $T^H$ and when the train is in section H—J it is supplied with the proceed code from transformer $T^J$. When the train is in section H—J so that relay $R^H$ is de-energized, front contact 130 of this relay is open and back contact 130 of the relay is closed so that current flows from terminal $a$, through back contact 130 of relay $R^H$, wire 131, a "CN" contact on circuit controller $W^g$, wire 132, and primary 4 of transformer $T^H$ to terminal $b$. A following train entering section G—H under these conditions will therefore be supplied with uninterrupted alternating current and cannot receive either the proceed code or the caution code. The following train will therefore receive a stop indication.

If relay $R^J$ is de-energized when a train passes signal $r^G$ at proceed the entrance of the train into section G—H energizes relay $K^H$ as before and current is supplied from terminal $a$ through back contact 122 of relay $R^J$, wire 143, a "CN" contact on circuit controller $W^h$, wires 140 and 144, a "CN" contact on circuit controller $W^g$, wire 145, contact 14—14$^b$ of relay $K^H$, wires 128 and 129, front contact 130 of relay $R^H$, wire 131, a "CN" contact of circuit controller $W^g$, wire 132 and primary 4 of transformer $T^H$ to terminal $b$. Under these conditions current is supplied to the rails of section G—H in accordance with the caution code.

When the train enters section H—J, the de-energization of relay $R^H$ operates to energize relay $K^J$ as explained hereinbefore, and current then flows from terminal $a$, through back contact 122 of relay $R^J$, wire 143, a "CN" contact on circuit controller $W^h$, wires 140 and 141, contact 14—14$^b$ of relay $K^J$, wire 125, and primary 4 of transformer $T^J$ to terminal $b$. Current is therefore supplied to the rails of section H—J in accordance with the caution code. When relay $R^J$ is de-energized therefore a train passing through the stretch of track $e$ receives current in accordance with the caution code throughout the stretch. If a following train enters section G—H with the first train still in section H—J, so that relay $R^H$ is de-energized, the circuit for transformer $T^H$ would be closed through back contact 130 of relay $R^H$ directly to terminal $a$, so that uninterrupted current would be supplied to section G—H and the train would receive a stop indication.

I will next assume that the switches of cross-over $g$ are reversed to permit a movement of traffic from section G—H into section E—F. Circuit controller $W^g$ is therefore reversed so that the "R" and "CR" contacts of this circuit controller are closed. If, now, a train enters section G—H, passing signal $r^G$ at proceed, relay $R^G$ becomes de-energized so that relay $Z^G$ will become de-energized, and this will energize relay $K^H$, as explained hereinbefore. The circuit for transformer $T^H$ under these conditions may be traced from terminal $a$, through a "CR" contact on circuit controller $W^g$, wires 146 and 145, contact 14—14$^b$ of relay $K^H$, wires 128 and 148, front contact 149 of relay $R^E$, a "CR" contact on circuit controller $W^g$, wires 150 and 132, and primary 4 of transformer $T^H$ to terminal $b$. Current is therefore supplied to the rails of section G—H in accordance with the caution code.

When relay $Z^G$ became energized, it closed a pick-up circuit for relay $Z^E$, and the energization of the latter relay caused relay $K^F$ to be set into operation. This continues after relay $Z^G$ opens because of the stick circuit for relay $Z^E$ which becomes closed when the train enters section E—F and opens relay $R^E$. The operation of contact 14—14$^a$ of relay $K^F$ periodically interrupts the circuit for transformer $T^F$, which circuit passes from terminal $a$, through a "CR" contact of circuit controller $W^g$, wires 138 and 135, a "CN" contact on circuit controller $W^h$, wire 136, contact 14—14$^b$ of relay $K^F$, wire 121 and primary 4 of transformer $T^F$ to terminal $b$. The rails of section E—F are therefore supplied with current in accordance with the caution code, so that when the train enters this section it will receive a caution indication.

It should be pointed out that when the train entered section E—F, thereby de-energizing relay $R^E$, the circuit previously traced for primary 4 of transformer $T^F$ over front contact 149 of relay $R^E$ was opened, and another circuit was closed for this primary from terminal $a$, through wire 147, back contact 149 of relay $R^E$, a "CR" contact on circuit controller $W^g$, wires 150 and 132, and primary 4 of transformer $T^H$ to terminal $b$. A following train entering section G—H would therefore be supplied with uninterrupted alternating current and would receive a stop indication.

I will next assume that the switches of cross-over $g$ are also reversed to permit movements of traffic from section G—H over cross-over $g$ into section E—F and thence over cross-over $h$ into section H—J. If, now, a train moving in the direction of the arrow passes signal $r^G$ at proceed, the de-energization of relay $R^G$ picks up relay $Z^G$ and sets relay $K^H$ into operation. The operation of this relay therefore interrupts the current supplied to primary 4 of transformer $T^H$, over "CR" contact of circuit controller $W^g$, contact 14—14$^b$ of relay $K^H$, and front contact 149 of relay $R^E$, and current is supplied to the rails of section G—H in accordance with the caution code. The closing of relay $Z^G$ has also caused relay $Z^E$ to become energized, and this has caused relay $K^H$ to be set into operation as before. The operation of contact 14—14$^b$ of this relay interrupts the circuit for primary 4 of transformer $T^F$ which circuit passes over a "CR" contact of circuit controller $W^h$, so that current is supplied to the rails of section E—F in accordance with the caution code. When the train, moving through cross-over $h$, enters section H—J, the de-energization of relay $R^H$ completes a pick-up circuit for relay $Z^H$ over an "R" contact on circuit controller $W^h$ and front contact 106 of relay $Z^E$, so that relay $Z^H$ becomes energized and is thereafter maintained in its energized condition over its stick circuit. Relay $K^J$ is therefore energized and operates to periodically interrupt current supplied to primary 4 of transformer $T^J$ in accordance with the caution code. It should be pointed out that when the switches of cross-overs $g$ and $h$ are both reversed, a train traversing the stretch of track shown in the drawing, is supplied with current in accordance with the caution code irrespective of the condition of energization of relays $R^J$ and $R^F$.

If either of the signals $r^E$ and $r^G$ indicates stop when a train passes such signal upon entering the stretch of track shown in the drawing, the corresponding stick relay will not become energized, because the pick-up circuit for the stick relays corresponding to these signals include contacts on the signal circuit controllers U which are closed only when the signal indicates proceed. If the stick relays do not pick up, the coding relays do not become energized, and if the coding relays do not become energized, the current supplied to the trackway is not interrupted in accordance with one of the codes. It follows that if a train passes one of the signals which is not indicating proceed, the train will be supplied with uninterrupted alternating current throughout the stretch, and cannot receive a caution or a proceed indication.

When a train is proceeding over one of the cross-overs $g$ or $h$, it is necessary to supply current to the rails occupied by the train. In the form of my invention here shown, this is accomplished by dividing each of the cross-overs adjacent its center with insulated joints 155. Referring for example to cross-over $g$, the rails 1 and 1$^a$ of the lower portion of the cross-over are connected by means of conductors 151 and 152 attached to the rails adjacent the insulated joints 155 with rails 1$^a$ and 1 respectively of section G—H. Insulated joints 153 are also inserted in the rails 1 and 1$^a$ of section G—H immediately to the left of the points of connection of conductors 151 and 152 and a small impedance 154 is shunted around each insulated joint 153. It will be plain therefore that when current is being supplied to the rails of section G—H from transformer $T^H$ the potential drop in the impedance 153 is effective to force a current through the conductors 151 and 152 to the rails of the lower part of cross-over $g$. As soon as the train moving from left to right passes the insulated joints 155 current will be supplied to the train from transformer $T^F$. The arrangement of parts for supplying current to the train traversing cross-over $h$ is similar to the parts just described for cross-over $g$.

It is sometimes desirable to operate the trains over a stretch of single track in both directions. In Fig. 10 I have illustrated an arrangement of trackway circuits for permitting traffic movement of this kind. In this view the winding 6 of each track relay R is connected across the rails adjacent the right-hand end of the corresponding section. The repeater relay P for each section is located adjacent the left-hand end of the corresponding section and is controlled over a front contack 218 of the track relay for the same section. Alternating current is normally supplied to the rails of each track section by a track transformer T having its secondary 3 connected across the rails adjacent the left-hand end of the corresponding section. Primary 4 of each track transformer T is normally supplied with current over front contact 191 of the adjacent repeater relay P.

Each track section is further provided with two line relays designated by the reference characters 158 and 159 with exponents corresponding to the location. Each track section is also provided with two stick relays designated by the reference characters 160 and 161 with appropriate distinguishing exponents. Referring particularly to line relay 159$^B$, this relay is provided with two circuits, one of which passes from terminal $a$, through wire 162, front contact 163 of line relay 159$^C$, wires 164 and 165, front contact 166 of relay $R^C$, wire 167, winding of relay 159$^B$, wire 168, front contact 169 of relay $P^B$, wire 170 and back contact 171 of relay 160$^B$ to terminal $b$. This circuit is closed only when relay 160$^B$ is de-energized and when relays $P^B$, $R^C$, and 159$^C$ are all energized. When relay 161$^C$ is energized, a second circuit is closed for relay 159$^B$ from terminal $a$, through front contact 173 of relay 161$^C$, wires 174 and 165, front contact 166 of relay R$^C$, wire 167, winding of relay 159$^B$, wire 168, front contact 169 of relay P$^B$, wire 170, and back contact 171 of relay 160$^B$ to terminal $b$. The control of each of the remaining line relays 159 and 158 is similar to that just explained for relay 159$^B$ and will be understood from the drawing without tracing the circuit for these relays in detail.

Stick relay 161$^B$ is provided with a pick-up circuit which passes from terminal $a$, through wire 175, back contact 176 of relay 158$^B$, wire 177, back contact 178 of relay R$^B$, wire 179, back contact 180 of relay P$^B$, wire 181, front contact 182 of relay 159$^B$, wires 183 and 184, and winding of relay 161$^B$ to terminal $b$. Relay 161$^B$, having been energized over the pick-up circuit just traced is maintained in its energized condition as long as relay 159$^B$ is de-energized, over a circuit which may be traced from terminal $a$, through wire 185, back contact 186 of relay 159$^B$, wire 187, front contact 188 of relay 161$^B$, wires 189 and 184, winding of relay 161$^B$ and back to terminal $b$. The remaining relays 161 and 160 are each provided with circuits similar to those just traced for relay 161$^B$.

The control of line relays 158 and 159 and the stick relays 160 and 161 is similar to the control of these relays in the usual and well known absolute permissive block signaling systems and their operation will be readily understood by those skilled in the art. For example, one system embodying line relays and stick relays controlled in this manner is disclosed in Letters Patent of the United States No. 1,602,137, granted to me on October 5, 1926, for Railway traffic controlling apparatus.

A coding relay K is located adjacent the junction of each two track sections and is controlled over the back contacts of the adjacent repeater relay and track relay so that if either of these relays is de-energized the coding relay will be operated. For example, relay K$^B$ is provided with a circuit including back contact 219 of relay P$^B$ and back contact 218 of relay R$^B$ in parallel and the de-energization of either of these relays, as by the presence of a train in section A—B or section B—C, will cause relay K$^B$ to operate.

As shown in the drawing the stretch of track is unoccupied and all track relays R, and hence all repeater relays P, are energized, current being supplied to the rails of each section from the associated transformer T. All line relays 158 and 159 are also energized and all stick relays 160 and 161 are de-energized. Coding relays K are also de-energized. In explaining the operation of the apparatus I will first assume that a train travelling from left to right passes through the stretch of track shown in the drawing. The presence of this train in the section to the left of point A de-energizes relay R$^A$ and therefore relay 158$^A$ is de-energized. The de-energization of relay 158$^A$ interrupts the circuit for relay 158$^B$, and the opening of relay 158$^B$ interrupts the circuit for relay 158$^C$. When the train enters section A—B, relay R$^B$ becomes de-energized, thereby opening the circuit for relay P$^A$. The closing of back contact 180 of this relay closes the pick-up circuit for relay 161$^A$. At the same time, the opening of front contact 169 of relay P$^A$ opens the circuit for relay 159$^A$, and after an interval of time due to its slow acting characteristics the relay 159$^A$ opens. When this happens, the pick-up circuit for relay 161$^A$ is opened but the relay is held in its energized condition by its stick circuit over back contact 186 of relay 159$^A$. The line relay 159$^A$ being slow acting, it is insured that a sufficient time will elapse after the closing of back contact 180 of relay P$^A$, for relay 161$^A$ to become fully energized. The closing of back contact 218 of relay R$^B$ sets relay K$^B$ into operation, and current is now periodically supplied to primary 36 of a transformer L$^B$ having its secondary 35 connected across the rails adjacent the right-hand end of section A—B. The circuit for transformer L$^B$ may be traced from terminal $a$, through wire 192, contact 33—33$^a$ of relay K$^B$, wire 193, front contact 194 of relay 159$^B$, wire 195, back contact 196 of relay R$^B$, wire 197, and primary 36 of transformer L$^B$ to terminal $b$. When this circuit is closed, current is supplied to the rails of section A—B by transformer L$^B$ in accordance with the proceed code. When the train enters section B—C, relays R$^C$ and P$^B$ open, relay 161$^B$ picks up, and relay 159$^B$ opens, completing the stick circuit for relay 161$^B$. The closing of back contact 218 of relay R$^C$ sets coding relay K$^C$ into operation and current is therefore supplied over contact 33—33$^a$ of relay K$^C$ to primary 36 of transformer L$^C$ so that current is supplied to the rails of section B—C in accordance with the proceed code. After the train moves out of section A—B alternating current supplied to the rails of the section by transformer T$^A$ energizes relay R$^B$, thereby energizing relay P$^A$ and opening back contact 218. Relay K$^B$ still operates however, its circuit now being closed at back contact 219 of relay P$^B$. Current is now supplied to the rails by transformer T$^A$, and transformer L$^B$ is de-energized. Relay 159$^A$ also becomes energized, its circuit being closed over front contact 173 of relay 161$^B$, and front contact 166 of relay R$^B$. The opening of back contact 186 of relay 159$^A$ de-energizes relay 161$^A$ and returns the apparatus to its normal condition. The operation of the apparatus when the train moves out of section B—C will be understood from the foregoing without further explanation.

I will assume that the train is in the section to the right of point C, so that relays $P^C$ and $159^C$ are de-energized, and relay $161^C$ is energized. Relay $K^C$ is of course, energized but uninterrupted current is being supplied to the rails of section B—C from transformer $T^B$ and the supply of current to transformer $L^C$ is interrupted at back contact 196 of relay $R^C$, now open. I will next assume that a second train also moves from left to right, entering the stretch of track shown in the drawing. The operation of the apparatus associated with section A—B in response to the movements of this second train through the section is the same as described in connection with the first train and will be understood without further explanation. When the second train enters section B—C, however, the de-energization of relays $R^C$ and $P^B$ de-energizes relay $159^B$ as before and relay $161^B$ becomes energized. But current is now supplied to section B—C from an auxiliary transformer $Q^C$ having its secondary 29 connected across the rails at an intermediate point in the section. The circuit for the primary 30 of transformer $Q^C$ may be traced from terminal $a$, through contact 33—$33^b$ of relay $K^C$, wire 198, front contact 199 of relay $161^C$, wire 200, back contact 201 of relay $R^C$, wire 202, and primary 30 of transformer $Q^C$ to terminal $b$. The rails of section B—C are therefore supplied with interrupted alternating current in accordance with the caution code from transformer $Q^C$. The following train therefore receives a caution indication between point B and the point of connection of transformer $Q^C$, and a stop indication between the latter point and point C.

I will next assume that a train moving from right to left passes through the stretch of track shown in the drawing. The entrance of the train into the section to the right of point C de-energizes relays $P^C$ and $159^C$. Relays $159^B$ and $159^A$ are therefore de-energized, relays 158 are all energized and relays 160 and 161 are all de-energized. When a train enters section B—C, the de-energization of relays $R^C$ and $P^B$ picks up relay $160^C$ and de-energizes relay $158^C$ to close the stick circuit for relay $160^C$. The closing of back contact 219 of relay $P^B$ sets relay $K^B$ into operation and current is now supplied to transformer $T^B$ from terminal $a$, through wire 204, contact 14—$14^a$ of relay $K^B$, wire 205, front contact 206 of relay $158^B$, wire 207, back contact 191 of relay $P^B$, wire 208 and primary 4 of transformer $T^B$ to terminal $b$. Under these conditions therefore the train in section B—C is supplied with current according to the proceed code from transformer $T^B$.

When the train enters section A—B, the apparatus associated with this section operates in the same manner as just described in connection with section B—C and the train receives a proceed indication throughout the section. When the train moves out of section B—C, relays $R^C$ and $P^B$ become energized and relay $158^C$ picks up over front contact 222 of relay $160^B$. Current is now supplied to transformer $T^B$ over a circuit which passes from terminal $a$, through wire 216, back contact 206 of relay $158^B$, wire 207, back contact 191 of relay $P^B$, wire 208 and primary 4 of transformer $T^B$ to terminal $b$. By virtue of the circuit just traced uninterrupted current is supplied to the rails of section B—C by transformer $T^B$. Means are provided, however, for at times interrupting this current to give a caution code to a second train entering a section when the section in advance is occupied by a train moving in the same direction. For this purpose each track section is provided with an auxiliary transformer designated by the reference character Y with an exponent corresponding to the location and having its primary 156 connected across the rails adjacent an intermediate point in the section. Referring particularly to transformer $Y^B$, the secondary of this transformer is provided with a circuit which may be traced from the right-hand terminal of secondary 157, through wire 210, contact 190—$190^a$ of relay $K^B$, wire 211, front contact 212 of relay $160^B$, wire 213, back contact 214 of relay $P^B$ and wire 215 back to the left-hand terminal of secondary 157 of transformer $Y^B$. When this circuit is closed the secondary of transformer $Y^B$ is short circuited and is effective to shunt the rails at the point of connection of the transformer so that the current between transformer $Y^B$ and point C is interrupted. It follows that when the circuit is being periodically closed by contact 190—$190^a$ of relay $K^B$, the rails of section B—C between the point of connection of transformer $Y^B$ and point C are being supplied with current in accordance with the caution code. The second train will therefore receive a caution indication between point C and transformer $Y^B$ and a stop indication between transformer $Y^B$ and point B.

Attention should be directed to the fact that if a train attempts to traverse the stretch of track in one direction when the stretch is already occupied by a train moving in the other direction, it will receive a stop indication. For example, I will assume that a train moving from right to left occupies section B—C. Relays $P^B$ and $R^C$ are de-energized and relays 159 are all de-energized. Relay $158^C$ is also de-energized but relay $160^C$ is energized. If, now, a train moving from left to right enters section A—B, the consequent de-energization of relay $R^B$ will not close the circuit for primary 36 of transformer $L^A$ because this circuit is open at front contact 194 of relay 159$^B$. Similarly the circuit for primary 30 of transformer Q$^B$ is open at front contact 199 of relay 161$^B$. The train in section A—B therefore can receive no alternating current from a point in advance of the train and a stop indication is therefore received by the train.

In similar manner if a train moving from left to right occupies section A—B so that relays P$^A$ and R$^B$ are de-energized relays 158 will all be de-energized and relay 159$^B$ will be de-energized and relay 161$^A$ will be energized. I will now assume that a train moving from right to left enters section B—C. The resulting de-energization of relay P$^B$ completes a circuit for transformer T$^B$ over back contact 191 of relay P$^B$ and back contact 206 of relay 158$^B$ so that uninterrupted alternating current is supplied to the rails of section B—C by transformer T$^B$. The shunting circuit for transformer Y$^B$ is open at front contact 212 of relay 160$^B$, now open, and the current supplied to the rails of section B—C therefore cannot be interrupted. The uninterrupted current which the train in section B—C receives, gives a stop indication aboard the train.

Although I have herein shown and described only a few forms of trackway apparatus embodying my invention, it is understood that various changes and modifications may be made therein within the scope of the appended claims without departing from the spirit and scope of my invention.

Having thus described my invention what I claim is:

1. Railway traffic controlling apparatus comprising a stretch of railway track, a coding relay controlled by traffic conditions and comprising two normally open contacts arranged at times to be operated intermittently so that the contacts are closed for different intervals of time, and means controlled by said coding relay for supplying current to said stretch.

2. Railway traffic controlling apparatus comprising a stretch of railway track, a coding relay controlled by traffic conditions, and comprising two contacts arranged at times to be operated intermittently so that the contacts are closed for different intervals of time, a source of energy, and means for connecting said source with the rails of the stretch over a selected one of said contacts.

3. Railway traffic controlling apparatus comprising a stretch of railway track, a coding relay controlled by traffic conditions and comprising two normally open contacts arranged at times to be operated intermittently so that the contacts are closed for different proportions of a given interval of time, and means controlled by traffic conditions for supplying current to said stretch over one or the other of said contacts.

4. In combination, a plurality of successive sections of railway track, a track relay connected with the rails of each section, a coding relay for each section comprising two contacts arranged at times to be operated intermittently so that the contacts are closed for different proportions of a given interval of time, a repeater relay controlled by each track relay, and means controlled by each repeater relay for at times supplying current to the section next in rear over a selected one of the contacts on an associated coding relay.

5. In combination, a plurality of successive sections of railway track, a track relay connected with the rails of each section, a coding relay for each section comprising two contacts arranged at times to be operated intermittently so that the contacts are closed for different proportions of a given interval of time, a repeater relay controlled by each track relay, a transformer for each section having its secondary connected with the rails of the associated section, and two circuits for the primary of each such transformer one including a front contact of the repeater relay for the section next in advance and one of the contacts on a coding relay, and the other circuit including a back contact of such repeater relay and the other contact of said coding relay.

6. Railway traffic controlling apparatus comprising a stretch of railway track, a transformer having its secondary connected with the rails of the stretch, a repeater relay controlled in accordance with traffic conditions, a coding relay controlled by traffic conditions and comprising two contacts arranged to be closed intermittently when the coding relay is operated so that the contacts are closed for different proportions of a given interval of time, a circuit for the primary of said transformer including a front contact of said repeater relay and one contact of said coding relay, and a second circuit for said primary including a back contact of said repeater relay and the remaining contact of said coding relay.

7. In combination, a plurality of successive sections of railway track, a track relay for each section, a repeater relay for each section controlled by the track relay for the section, a coding relay for each section controlled by the track relay for the section, and means controlled by each coding relay and the repeater relay for the next section in advance for supplying the rails of the section with interrupted alternating current for different proportions of a given interval of time.

8. In combination, a section of railway track, means for normally supplying current to the rails adjacent one end of the section, and means for at times supplying current intermittently to the rails adjacent the opposite end of the section for different proportions of a given interval of time depending upon traffic conditions.

9. In combination, a section of railway track, means for normally supplying current to the rails adjacent one end of the section, and means operating when said section is occupied for supplying current intermittently to the rails adjacent the opposite end of the section for different proportions of a given interval of time depending upon traffic conditions.

10. In combination, a section of railway track, means for constantly supplying current to one end of the section, a track relay connected with the rails adjacent the opposite end of the section, a coding relay controlled by said track relay and comprising two contacts arranged at times to operate intermittently so that the contacts are closed for different proportions of a given interval of time, and means for at times supplying current to the rails adjacent such opposite end of the section over one or the other of said contacts depending upon traffic conditions.

11. In combination, a section of railway track, two transformers one located at each end of said section and each having its secondary connected across the rails of the section, means for constantly supplying alternating current to the primary of one transformer, and means for at times supplying alternating current intermittently to the primary of the remaining transformer so that such current flows in said primary for different proportions of a given interval of time depending upon traffic conditions.

12. In combination, a plurality of successive sections of railway track, means for constantly supplying alternating current to the rails adjacent the entrance end of each section, a track relay for each section connected across the rails adjacent the exit end of the section, a line relay for each section controlled by the line relay for the section in advance and by the track relay for the associated section, a coding relay for each section controlled by the track relay for the section next in rear, and means controlled by each coding relay and by the associated line relay for at times supplying alternating current intermittently to the rails adjacent the exit end of the section next in rear.

13. In combination, a plurality of successive sections of railway track, means for constantly supplying alternating current to the rails adjacent the entrance end of each section, a track relay for each section connected across the rails adjacent the exit end of the section, a line relay for each section controlled by the line relay for the section in advance and by the track relay for the associated section, a coding relay for each section controlled by the track relay for the section next in rear, and means controlled by each coding relay and by the associated line relay for at times supplying alternating current intermittently to the rails of the section next in rear so that current flows in these rails for different proportions of a given interval of time depending upon traffic conditions.

14. In combination, a plurality of successive sections of railway track, means for constantly supplying alternating current to the rails adjacent the entrance end of each section, a track relay for each section connected across the rails adjacent the exit end of the section, a line relay for each section controlled by the line relay for the section next in advance and by the track relay for the associated section, a coding relay for each section controlled by the track relay for the section next in rear, and means controlled by each coding relay for at times supplying alternating current intermittently to the rails of the section next in rear so that current flows in these rails for different proportions of a given interval of time depending upon the condition of the line relay associated with such coding relay.

15. In combination, a plurality of successive sections of railway track, means for constantly supplying alternating current to the rails adjacent the entrance end of each section, a track relay for each section connected with the rails adjacent the exit end of such section, a repeater relay for each section, a polarized line relay for each section controlled by the track relay for the associated section and by the repeater relay for the section next in advance, a coding relay for each section controlled by the track relay for the section next in rear and comprising two contacts operating intermittently when the coding relay is energized so that the contacts are closed for different proportions of a given interval of time, a circuit for each repeater relay closed only when the adjacent line relay is energized, a transformer for each section having its secondary connected across the rails adjacent the exit end of the section, a circuit for the primary of each said transformer including a front contact of the adjacent repeater relay and one of the contacts of an adjacent coding relay, and a second circuit for said primary including a back contact of such repeater relay and the remaining contact of such coding relay.

16. In combination, a section of railway track, a source of current, a member mounted to oscillate, contacts operated by said member, a normally de-energized electromagnetic mechanism controlled by one of said contacts for causing sustained oscillation of said member, means for energizing said mechanism when a train enters said section, and means controlled by another of said contacts for periodically supplying train governing current from said source to the rails of said section.

17. In combination, a section of railway track, a normally open circuit including an oscillating electromagnetic device, a second circuit controlled by said device for supplying periodically interrupted train governing current to the rails of said section, and means for closing said first circuit when a train enters said section.

18. In combination, a section of railway track, a normally open circuit including an oscillating electromagnetic device, a source of alternating current, a second circuit controlled by said device for periodically supplying train governing current from said source to the rails of said section, and means for closing said first circuit when a train enters said section.

19. In combination, a section of railway track, a member mounted to oscillate, a normally open circuit including an electromagnetic device for causing sustained oscillation of said member, a second circuit controlled by said member for supplying periodically interrupted train governing current to the rails of said section, and means for closing said first circuit when a train enters said section.

In testimony whereof I affix my signature.

HERBERT A. WALLACE.